(12) United States Patent
Kasazumi et al.

(10) Patent No.: US 8,317,333 B2
(45) Date of Patent: *Nov. 27, 2012

(54) METHOD AND DEVICE FOR CONVERTING AN EMISSION BEAM FROM A LASER LIGHT SOURCE INTO 2-DIMENSIONAL LIGHT

(75) Inventors: Kenichi Kasazumi, Osaka (JP); Yasuo Kitaoka, Osaka (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,925

(22) Filed: Aug. 8, 2011

(65) Prior Publication Data

US 2011/0292350 A1    Dec. 1, 2011

Related U.S. Application Data

(62) Division of application No. 11/917,986, filed as application No. PCT/JP2006/312050 on Jun. 15, 2006, now Pat. No. 8,016,428.

(30) Foreign Application Priority Data

Jun. 20, 2005 (JP) ................................ 2005-178769
Jun. 20, 2005 (JP) ................................ 2005-178770

(51) Int. Cl.
   *G03B 21/26*   (2006.01)
(52) U.S. Cl. ......................................................... 353/34
(58) Field of Classification Search .................... 353/34, 353/37, 50, 51, 82, 98; 359/204.1–204.5
   See application file for complete search history.

(56) References Cited

U.S. PATENT DOCUMENTS 3,941,456 A    3/1976 Schilz et al.
(Continued)

FOREIGN PATENT DOCUMENTS

JP              10-270326           10/1998
(Continued)

OTHER PUBLICATIONS

International Search Report issued Sep. 12, 2006 in corresponding International (PCT) Application No. PCT/JP2006/312050.

(Continued)

*Primary Examiner* — Thanh Luu
(74) *Attorney, Agent, or Firm* — Wenderoth, Lind & Ponack, L.L.P.

(57) ABSTRACT

A 2-dimensional beam scan unit reflects emission beams from a red laser light source, a green laser light source and a blue laser light source and scans in a 2-dimensional direction. Diffusion plates diffuse the respective light beams scanned in the 2-dimensional direction to introduce them to corresponding spatial light modulation elements. The respective spatial light modulation elements modulate the respective lights in accordance with video signals of the respective colors. A dichroic prism multiplexes the lights of the three colors after the modulation and introduces the multiplexed lights to a projection lens so that a color image is displayed on a screen. Since the 2-dimensional light emitted from the beam scan unit is diffused to illuminate the spatial light modulation element, it is possible to change the optical axis of the beam emerging from the light diffusion member for irradiating the spatial light modulation element moment by moment, thereby effectively suppressing speckle noise.

3 Claims, 30 Drawing Sheets

U.S. PATENT DOCUMENTS

| | | | |
|---|---|---|---|
| 4,155,630 A | 5/1979 | Ih | |
| 6,183,092 B1 * | 2/2001 | Troyer | 353/31 |
| 6,594,090 B2 * | 7/2003 | Kruschwitz et al. | 359/707 |
| 7,271,962 B2 | 9/2007 | Kasazumi et al. | |
| 7,304,731 B2 | 12/2007 | Hill | |
| 2003/0039036 A1 | 2/2003 | Kruschwitz et al. | |
| 2004/0080718 A1 | 4/2004 | Kojima | |
| 2006/0125969 A1 | 6/2006 | Chilla et al. | |

FOREIGN PATENT DOCUMENTS

| | | |
|---|---|---|
| JP | 11-218726 | 8/1999 |
| JP | 2003-98476 | 4/2003 |
| JP | 2003-98601 | 4/2003 |
| JP | 2003-186112 | 7/2003 |
| JP | 2004-264776 | 9/2004 |
| JP | 2005-84117 | 3/2005 |
| WO | 2005/008330 | 1/2005 |

OTHER PUBLICATIONS

Kasazumi et al., "A Practical Laser Projector with New Illumination Optics for Reduction of Speckle Noise", *Japanese Journal of Applied Physics*, vol. 43, No. 8B, 2004, pp. 5904-5906.

* cited by examiner

METHOD AND DEVICE FOR CONVERTING AN EMISSION BEAM FROM A LASER LIGHT SOURCE INTO 2-DIMENSIONAL LIGHT

CROSS-REFERENCE TO RELATED APPLICATION

This application is a divisional of U.S. application Ser. No. 11/917,986, filed Dec. 18, 2007 now U.S. Pat. No. 8,016,428, which is a National Stage application of International Application No. PCT/JP2006/312050 filed Jun. 15, 2006, the entireties of which are incorporated herein by reference.

BACKGROUND OF THE INVENTION

I. Technical Field

The present invention relates to a 2-dimensional image display device, an illumination light source and an exposure illumination device and also to a video display device such as a video projector, a television receiver or a liquid crystal panel.

II. Description of the Related Art

In recent years, laser display devices using laser light sources have attracted more attention. Conventionally, color spectra of fluorescent materials are wide and only the subdued color can be obtained even upon displaying a single color in a television receiver using a cathode-ray tube. On the other hand, in a laser display device using laser light sources, it has become possible to display a very vivid image having high color purity by using laser light sources having suitable wavelengths since lights from the respective light sources are monochromatic lights.

FIG. 29 shows the schematic construction of a conventional laser display device. Lights from laser light sources 101a to 101c of RGB three colors are intensity-modulated by light modulation elements 106a to 106c in accordance with an inputted video signal, and multiplexed using a mirror 103 and dichroic mirrors 102a, 102b. The multiplexed lights pass through a condenser lens 107 and are scanned in x-direction by a polygonal scanner 104 and in y-direction by a galvanometer scanner 105 to display a 2-dimensional image on a screen 108. In the display of this construction, since the lights from the RGB light sources are monochromatic lights, it becomes possible to display a vivid image having high color purity by using laser light sources having suitable wavelengths.

On the other hand, the above laser display device has a problem of so-called speckle noise that is generated due to the use of laser light sources having high coherency as light sources. The speckle noise is fine nonuniform noise generated by the interference of scattered lights from the respective parts on the screen 108 when laser beams are scattered on the screen 108. In the above laser display device, this speckle noise was removed by vibrating the screen 108.

FIG. 30 shows the schematic construction of another conventional laser display device. Lights from laser light sources 100a to 100c of red, green and blue colors are incident on a light integrator 103 after having beam diameters thereof expanded by a beam expander 102. The light integrator 103 is an optical system for illuminating rectangular openings at the top of a spatial light modulation element 107 with uniform illumination intensity and has such a structure that two fly-eye lenses, in each of which rectangular unit lenses are arrayed in a 2-dimensional lattice, are arranged in series. Here, uniform illumination by the light integrator 103 is not described in detail.

The light having passed through the light integrator 103 illuminates the spatial light modulation element 107 through a field lens 108 and a diffusion plate 106 after passing through a condenser lens 112 (red and blue lights pass through after being reflected by a mirror 115). The lights of the respective colors modulated by the spatial light modulation element 107 are multiplexed by a dichroic prism 109, and a full color image is formed on a screen 111 by a projection lens 110.

Here, the diffusion plate 106 is a transparent substrate made of ground glass and gives a random phase distribution to the wavefront of the incident light in order to reduce the above speckle noise. If this diffusion plate 106 is oscillated by a diffusion plate oscillating mechanism 113, the phase distribution of the light projected on the screen 111 changes and the fine pattern of the speckle noise temporally changes as the diffusion plate 106 moves. If the diffusion plate 106 is oscillated so that a pattern change of the speckle noise is quicker than the afterimage time of an observer, the speckle noise is time-averaged by the observer's eyes and a high quality image free from noise is sensed. This state of speckle reduction is disclosed in detail, for example, in Japanese Journal of Applied Physics, Vol. 43, 8B, 2004.

However, in the former laser display device, the screen needs to be vibrated in order to suppress the speckle noise. Thus, it is not possible to use a fixed wall surface as a screen and to suppress the speckle noise by an optical system without vibrating the screen. Further, in the latter laser display device, the speckle noise can be suppressed by the optical system, but the beam expander 102, the light integrator 103 and the like are necessary to obtain uniform illumination, which complicates the optical system.

Patent Literature 1:
Japanese Examined Patent Publication No. 2003-98601

SUMMARY OF THE INVENTION

An object of the present invention is to provide a 2-dimensional image display device, an illumination light source and an exposure illumination device capable of obtaining uniform illumination and effectively suppressing speckle noise using a simple optical system.

One aspect of the present invention is directed to a 2-dimensional image display device, comprising at least one laser light source; a beam scan unit for converting an emission beam from the laser light source into a 2-dimensional light while scanning the emission beam at least in a 1-dimensional direction; a spatial light modulation element for spatially modulating the light scanned by the beam scan unit; and a light diffusion member disposed between the beam scan unit and the spatial light modulation element for diffusing the 2-dimensional light emerging from the beam scan unit.

Since the emission beam from the laser light source is converted into the 2-dimensional light while being scanned at least in the 1-dimensional direction in this 2-dimensional image display device, uniform illumination can be obtained. Further, since the light diffusion member is disposed between the beam scan unit and the spatial light modulation element and the 2-dimensional light emerging from the beam scan unit is diffused and irradiated onto the spatial light modulation element, the optical axis of the beam emerging from the light diffusion member to irradiate the spatial light modulation element can be changed moment by moment and speckle noise can be effectively suppressed. As a result, a beam expander, a light integrator and the like for uniform illumination become unnecessary, and uniform illumination can be obtained and the speckle noise can be effectively suppressed using a simple optical system.

Another aspect of the present invention is directed to an illumination light source, comprising at least one laser light source; a beam scan unit for scanning an emission beam from the laser light source at least in a 1-dimensional direction; and a light diffusion member for diffusing the emission beam scanned by the beam scan unit.

In this illumination light source, uniform illumination can be obtained since the emission beam from the laser light source is scanned at least in the 1-dimensional direction. Further, since the emission beam scanned by the beam scan unit is diffused, the optical axis of the beam emerging from the light diffusion member can be changed moment by moment, wherefore the speckle noise can be effectively suppressed. As a result, a beam expander, a light integrator and the like for uniform illumination become unnecessary, and uniform illumination can be obtained and the speckle noise can be effectively suppressed using a simple optical system.

DETAILED DESCRIPTION OF THE INVENTION

Hereinafter, embodiments of the present invention are described with reference to the accompanying drawings.

First Embodiment

Figure 1:
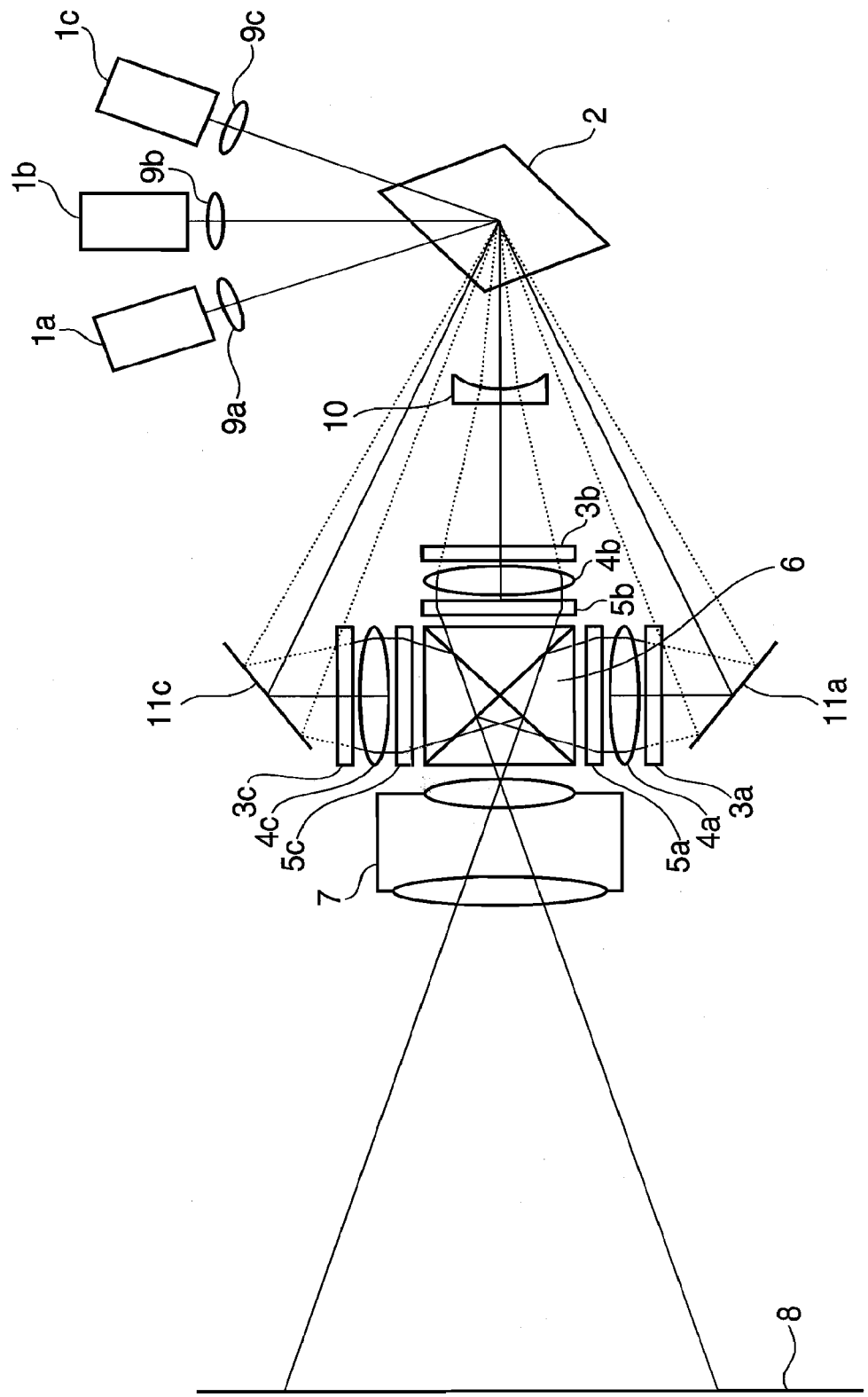
FIG. 1 is a schematic diagram showing the construction of a 2-dimensional display device according to a first embodiment of the invention.

FIG. 1 is a schematic construction diagram of a 2-dimensional image display device according to a first embodiment of the present invention. Laser beams emitted from a red laser light source 1a, a green laser light source 1b and a blue laser light source 1c are substantially condensed by condenser lenses 9a, 9b and 9c, and reflected and two-dimensionally scanned by a 2-dimensional beam scan unit 2.

Gas lasers such as He—Ne lasers, He—Cd lasers or Ar lasers or semiconductor lasers such as AlGaInP semiconductor lasers or GaN semiconductor lasers or SHG lasers having solid-state lasers as fundamental waves can be used as the laser light sources 1a, 1b and 1c. A micromachine moving mirror using a semiconductor process, a combination of a galvanometer mirror and a polygon mirror or the like can be used as the 2-dimensional beam scan unit 2. It should be noted that the 2-dimensional beam scan unit 2 is not particularly limited to the reflection-type 2-dimensional beam scan unit shown in FIG. 1 and may be a transmission-type 2-dimensional beam scan unit.

Red and blue laser beams reflected by the 2-dimensional beam scan unit 2 are reflected by the mirrors 11a, 11c, whereas a green laser beam is 2-dimensionally scanned on diffusion plates 3a, 3b and 3c after being diffused by a concave lens 10. At this time, the respective laser beams form microspots on the diffusion plates 3a, 3b and 3c since being substantially condensed by condenser lenses 9a, 9b and 9c.

The light beams diffused by the diffusion plates 3a, 3b and 3c illuminate spatial light modulation elements 5a, 5b and 5c while being substantially condensed by field lenses 4a, 4b and 4c. The field lenses 4a, 4b and 4c convert the beams having passed through the spatial light modulation elements 5a to 5c into convergent beams so that the beams efficiently pass through the aperture of a projection lens 7. The spatial light modulation elements 5a, 5b and 5c are, for example, constructed by liquid crystal panels and spatially modulate the beams of the respective colors in accordance with video signals corresponding to the respective colors to form 2-dimensional images of the respective colors. The beams having passed through the spatial light modulation elements 5a, 5b and 5c are multiplexed by a dichroic prism 6, and projected on a screen 8 by the projection lens 7.

Figure 2:
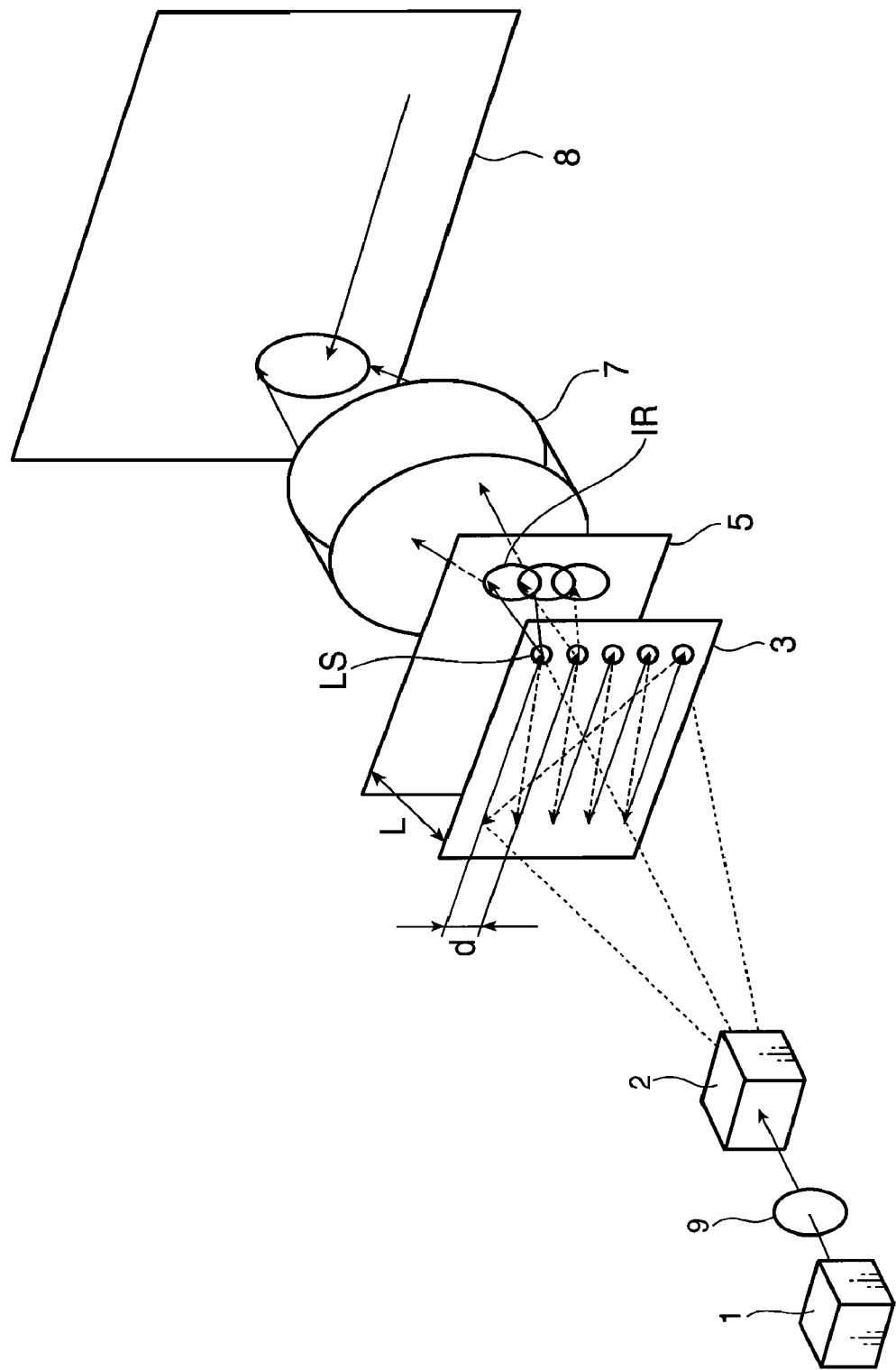
FIG. 2 is a conceptual diagram of an optical system for one color extracted from the 2-dimensional image display device shown in FIG. 1.

Next, an illumination method for the spatial light modulation elements and a state of suppressing speckle noise are described in detail with respect to FIG. 2 for the operation of the 2-dimensional image display device shown in FIG. 1. FIG. 2 is a conceptual diagram showing an optical system for one color extracted from the 2-dimensional image display device shown in FIG. 1. In FIG. 2, the field lenses, the dichroic prism and the like are not shown for simplicity and the 2-dimensional beam scan unit 2 is shown to be of the transmission type.

The diffusion plate 3 and the spatial light modulation element 5 are disposed substantially in parallel at a specified distance L from each other. The light beam having passed through the 2-dimensional beam scan unit 2 is substantially focused on the diffusion plate 3 to form a light spot LS. The beam diffused by the diffusion plate 3 irradiates an irradiation region IR shown by a circle in FIG. 2 on the spatial light modulation element 5. Only the irradiation region IR of the spatial light modulation element 5 is projected on the screen 8 by the projection lens 7 moment by moment, but the irradiation region IR moves to thoroughly scan the spatial light modulation element 5 as the light spot LS is scanned on the diffusion plate 3 by the 2-dimensional beam scan unit 2. As a result, a 2-dimensional image is entirely displayed on the screen 8. At this time, if a time for scanning the entire screen is shorter than the afterimage time of human eyes, a viewer can observe the entire 2-dimensional image without becoming conscious of the scanning of illumination on the screen. Upon displaying moving images, it becomes possible to more smoothly display moving images by scanning the entire screen within the display period of one frame.

Speckle noise as described in the description of the prior art is present in the image projected on the screen 8 at a certain point of time. When the light spot LS is scanned on the diffusion plate 3 and the position of the irradiation region IR on the spatial light modulation element 5 slightly changes, a phase pattern on the diffusion plate 3 changes to also change a speckle pattern on the screen 8. For example, if it is assumed that the distance L between the diffusion plate 3 and the spatial light modulation element 5 is 5 mm and a diffusion angle (full-angle-half-power) of the diffusion plate 3 is 10°, the size (diameter of the irradiation region IR) D of the irradiation region on the spatial light modulation element 5 is 5 mm×tan(10°)=about 880 micrometers. Conversely, one specific point on the spatial light modulation element 5 continues to be irradiated only for a period during which the light spot LS moves 880 micrometers on the diffusion plate 3.

Here, if the size of the light spot LS on the diffusion plate 3 is assumed to be 50 micrometers, 17 (=880 micrometers÷50 micrometers) or more different speckle patterns are generated while the specific point is irradiated. As a result, upon observing a projected image, a 2-dimensional image having the speckle noise suppressed can be observed since these speckle patterns are time-averaged. At this time, the smaller the spot size on the diffusion plate 3, the quicker the speckle pattern changes to be time-averaged. Therefore, the visible speckle noise can be more suppressed.

A spacing d of the tracks of the light spot LS on the diffusion plate 3 is an important factor contributing to the uniformity of the intensity of a displayed image. In order to realize a uniform intensity distribution, the spacing d preferably satisfies a relationship $d \leq 2 \times L \times \tan(\theta/2)$ if L, θ denote a distance between the diffusion plate 3 and the spatial light modulation element 5 and the diffusion angle (full-angle-half-power of the diffusion angle of an emerging beam when a parallel beam is incident on the diffusion plate) θ by the diffusion plate 3.

Further, the diffusion angle θ of the diffusion plate is restricted by an f-number of the projection lens 7. Specifically, a beam having a diffusion angle exceeding 1/f radian with respect to the f-number of the projection lens 7 is blocked by the projection lens 7. Accordingly, in order to ensure sufficient light utilization efficiency, the diffusion angle θ of the diffusion plate 3 may be set to about $2 \times \tan^{-1}(\frac{1}{2}f)$ or smaller. Conversely, upon using, for example, the diffusion plate 3 having a diffusion angle of 10°, the f-number of the projection lens 7 is preferably $(2 \times \tan(10°/2))^{-1} = 5.7$ or smaller and, for example, preferably about 5.

As described above, in this embodiment, the speckle noises of the lights of the respective colors can be suppressed and the intensity of the displayed image can be made uniform while ensuring sufficient utilization efficiencies for the respective lights. Therefore, a satisfactory full color video image can be displayed on the screen 8.

Figure 29:
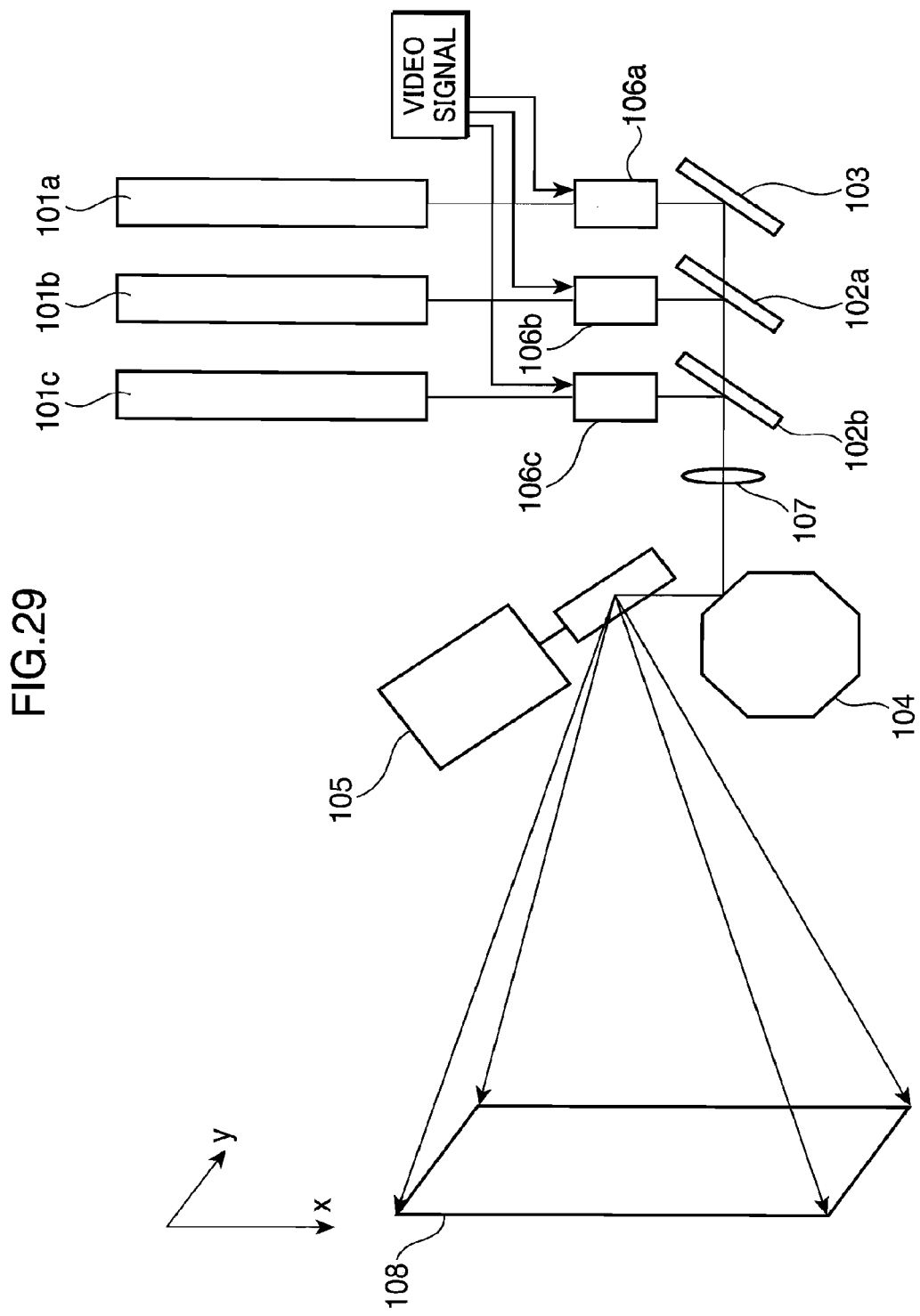
FIG. 29 is a schematic diagram showing the construction of a conventional laser display device.
Figure 30:
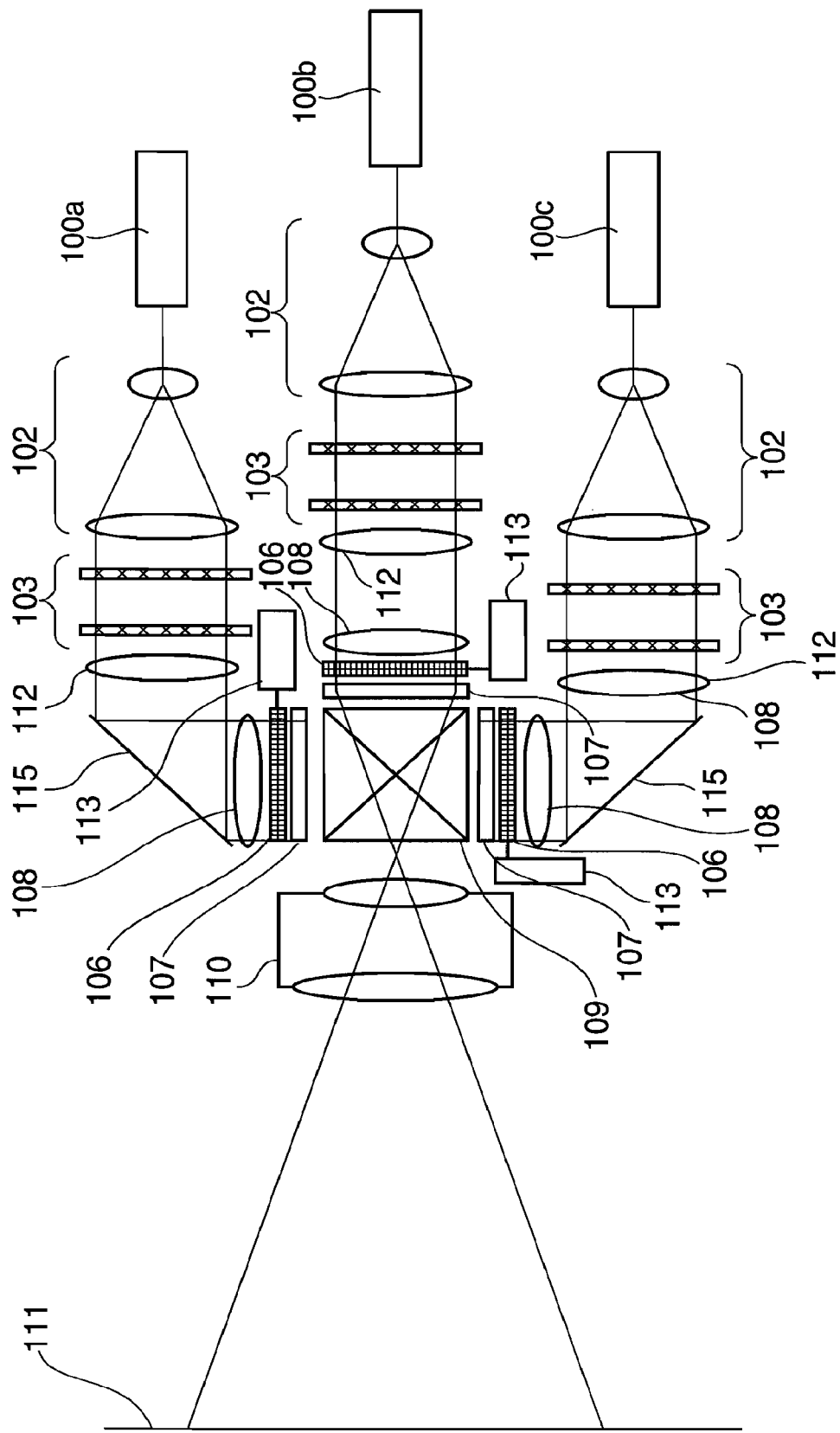
FIG. 30 is a schematic diagram showing the construction of another conventional laser display device.

A feature of the 2-dimensional image display device shown in FIG. 1 is that the optical axes of the emission beams from the respective laser light sources 1a, 1b and 1c mutually differ relative to the 2-dimensional beam scan unit 2, i.e. the emission beams from the respective laser light sources 1a, 1b and 1c are incident on the 2-dimensional beam scan unit 2 at mutually different angles. The dichroic mirrors 102a, 102b are used to align the optical axes of the emission beams from the laser light sources 101a to 101c of three colors in the conventional laser display device shown in FIG. 29, whereas the optical axes of the emission beams from the laser light sources 1a, 1b, 1c can be set in different directions in this embodiment. Thus, the dichroic mirrors for multiplexing become unnecessary and the 2-dimensional image display device can be realized by a simple optical system.

Another feature of the 2-dimensional image display device shown in FIG. 1 is that uniform illumination can be obtained without using a complicate optical component such as a light integrator between the 2-dimensional beam scan unit 2 and the diffusion plates 3. For example, in a presently commercially available projector using a discharge tube as a light source, illumination is made uniform using a light integrator including two lens arrays. However, in this embodiment, uniform illumination can be realized without using a large optical component and without depending on the intensity distribution of the emission beam from the light source.

Figure 3:
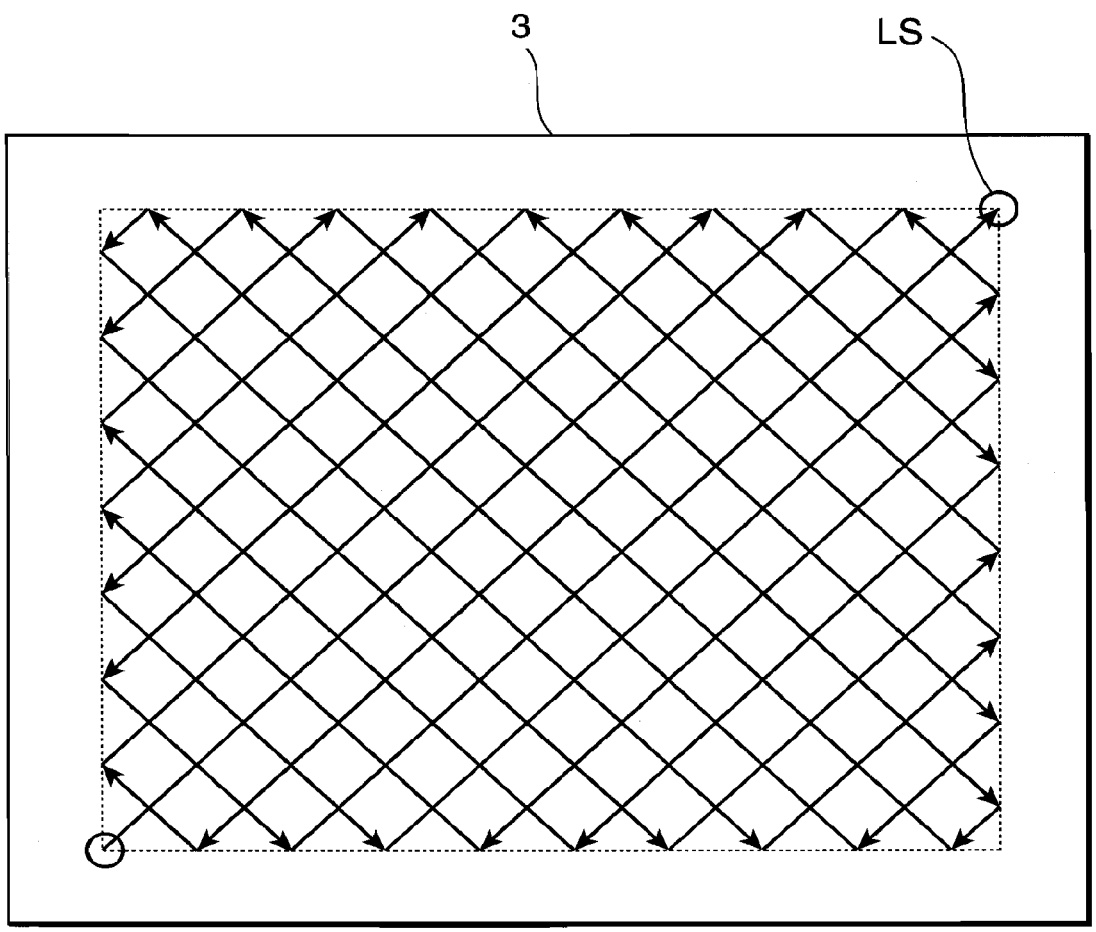
FIG. 3 is a diagram showing an illumination beam scanning method in the 2-dimensional image display device shown in FIG. 1.

Although such a scanning method for high-speed scanning in the horizontal direction and low-speed scanning in the vertical direction in the 2-dimensional beam scan unit 2 is shown in FIG. 2, it is possible to suppress a scanning speed by scanning in a lattice pattern as shown in FIG. 3. FIG. 3 is a diagram showing an example of tracks of the light spots LS on the diffusion plate 3 at the time of scanning using a triangular wave whose ratio of a scan frequency in vertical direction to the one in horizontal direction is 15:19. By scanning the emission beams from the laser light sources 1a, 1b and 1c with such a frequency at which a ratio of the scan frequency in vertical direction to the one in horizontal frequency is a ratio of integers prime to each other, a difference between the scanning speeds in horizontal and vertical directions can be made smaller. Therefore, the construction of the 2-dimensional beam scan unit 2 can be simplified and the diffusion plates 3 can be uniformly illuminated.

Second Embodiment

Figure 4:
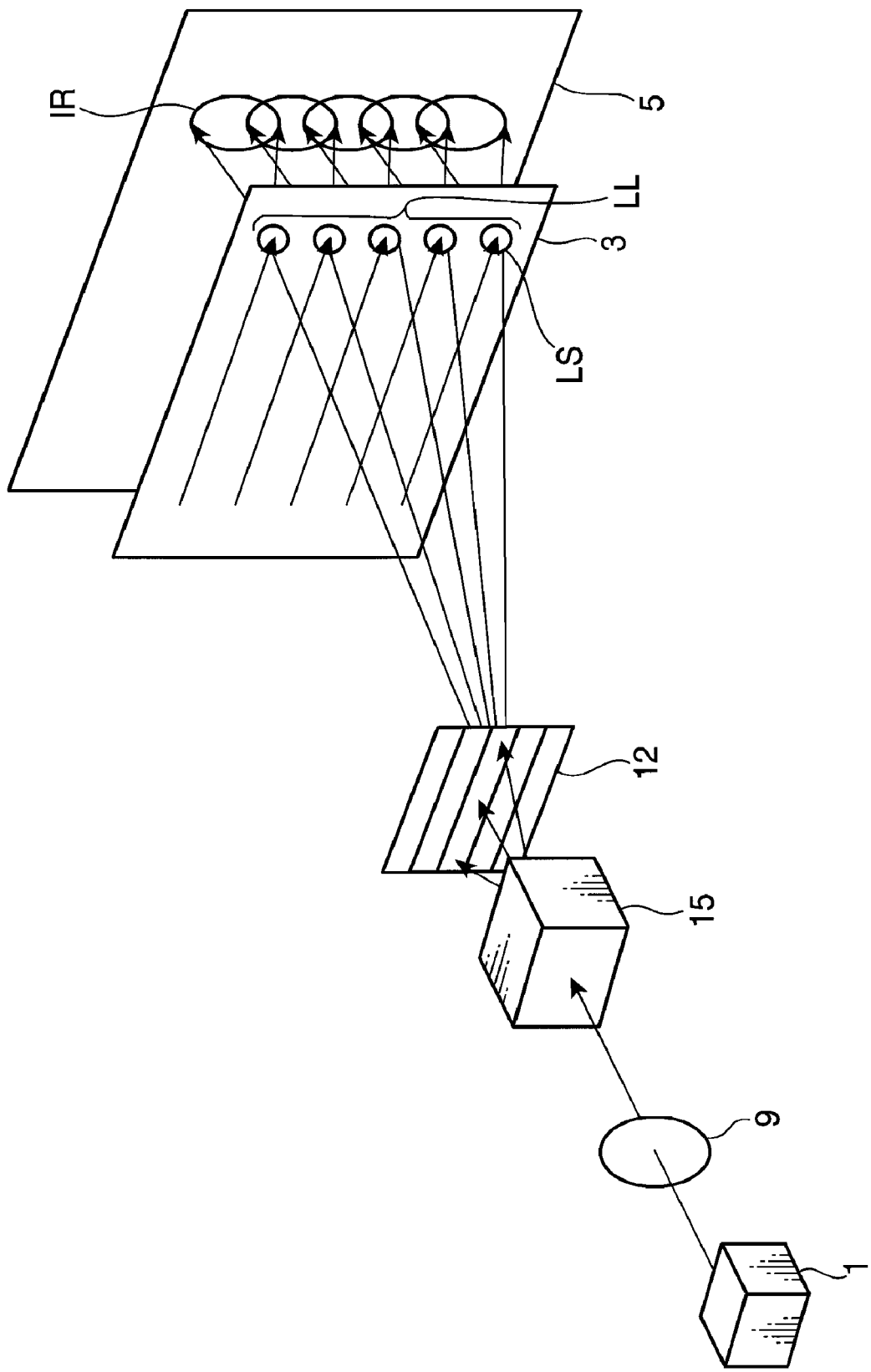
FIG. 4 is a conceptual diagram showing the construction of an optical system for one color extracted from a 2-dimensional image display device according to a second embodiment of the invention.

Next, a second embodiment of the present invention is described. FIG. 4 is a schematic construction diagram of an optical system for one color extracted from a 2-dimensional image display device according to the second embodiment of the present invention. Since the 2-dimensional image display device according to the second embodiment is the same as the one shown in FIG. 1 except the construction shown in FIG. 4, the same parts are neither shown nor described in detail.

In the second embodiment, instead of the 2-dimensional beam scan unit 2 shown in FIG. 2, a 1-dimensional beam splitting grating 12 and a 1-dimensional beam scan unit 15 are used as shown in FIG. 4. For example, a holographic optical element (HOE) or the like can be used as the 1-dimensional beam splitting grating 12, and a galvanometer mirror or the like can be used as the 1-dimensional beam scan unit 15.

In the above construction, after passing through a condenser lens 9, a light beam from a laser light source 1 is 1-dimensionally scanned in the 1-dimensional beam scan unit 15 and then incident on the 1-dimensional beam splitting grating 12. The 1-dimensional beam splitting grating 12 is, for example, a diffraction grating in which a 1-dimensional convexo-concave pattern is formed on a transparent substrate made of, e.g. glass and can split the incident light beam into a multitude of light beams having the same power by optimizing the cross-sectional shape of the grating.

A plurality of light beams split by the 1-dimensional beam splitting grating 12 become a light spot array LL as a 1-dimensional multibeam array, in which the plurality of light beams are vertically arrayed in a row, on a diffusion plate 3. At this time, since the light beam from the laser light source 1 is scanned in horizontal direction by the 1-dimensional beam scan unit 15, the light spot array LL is scanned in a direction perpendicular to a light diffraction direction and, when the position of an irradiation region IR on a spatial light modulation element 5 slightly changes, a phase pattern on the diffusion plate 3 changes to also change a speckle pattern generated on a screen 8.

In this way, the same effects as at the time of 2-dimensional scanning on the diffusion plate 3, i.e. the effects similar to those of the first embodiment can also be obtained in this embodiment. Further, since the scan direction is 1-dimensional and the scan frequency is small in this embodiment, the miniaturization, lower power consumption and lower cost of the 1-dimensional beam scan unit 15 can be realized.

Figure 5:
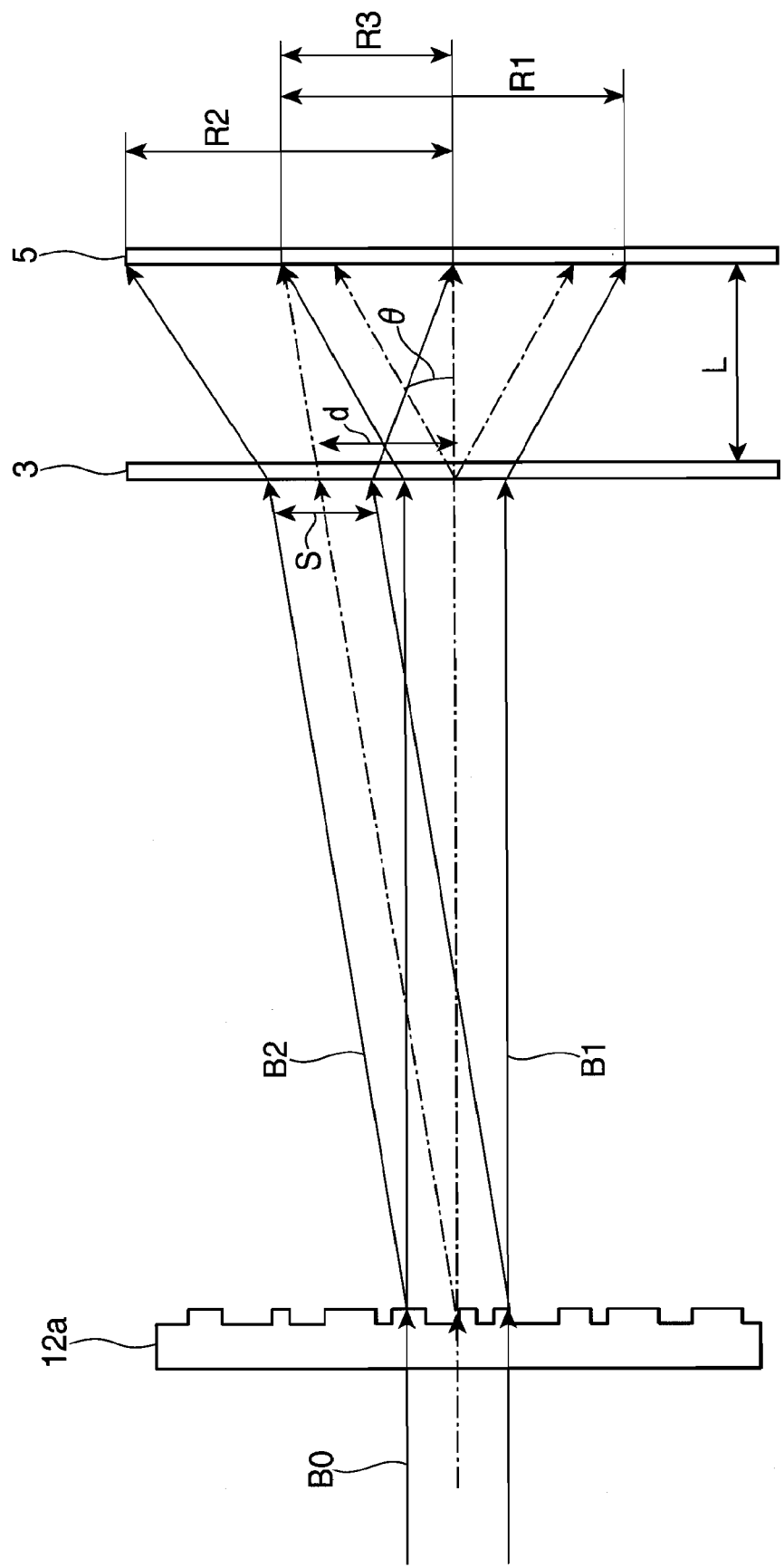
FIG. 5 is a diagram showing a suitable range of a light beam diameter on a diffusion plate shown in FIG. 1.

Further, a light beam diameter S on the diffusion plate 3 preferably satisfies a relationship S>L((−d if (, L and d denote the diffusion angle of the diffusion plate 3, a distance between the diffusion plate 3 and the spatial light modulation element 5 and the spacing between the adjacent light beams on the diffusion plate 3. FIG. 5 is a diagram showing a suitable range of the light beam diameter S on the diffusion plate 3 shown in FIG. 4. It should be noted that only two adjacent light beams out of a plurality of diffracted beams are shown in FIG. 5 to facilitate the description.

In the case of using a holographic optical element 12a as the 1-dimensional beam splitting grating 12 as shown in FIG. 5, the holographic optical element 12a causes a light beam B0 to be incident on the diffusion plate 3 while splitting it into a plurality of light beams. Out of the plurality of light beams, light beams B1, B2 emerging while defining the largest angle therebetween are shown. Here, if it is assumed that S denotes the diameter of the light beams B1, B2 on the diffusion plate 3, d the spacing between these light beams, (the diffusion angle of the diffusion plate 3 and L the distance between the diffusion plate 3 and the spatial light modulation element 5, the light beam B1 illuminates a region R1 on the spatial light modulation element 5, the light beam B2 illuminates a region R2 on the spatial light modulation element 5 and the light beams B1, B2 overlap in a region R3. Accordingly, if the light beam diameter S on the diffusion plate 3 satisfies the relationship S>L((−d, any arbitrary point on the spatial light modulation element 5 is illuminated by a diffused light of the plurality of light beams, wherefore the speckle noise can be reduced.

Figure 6:
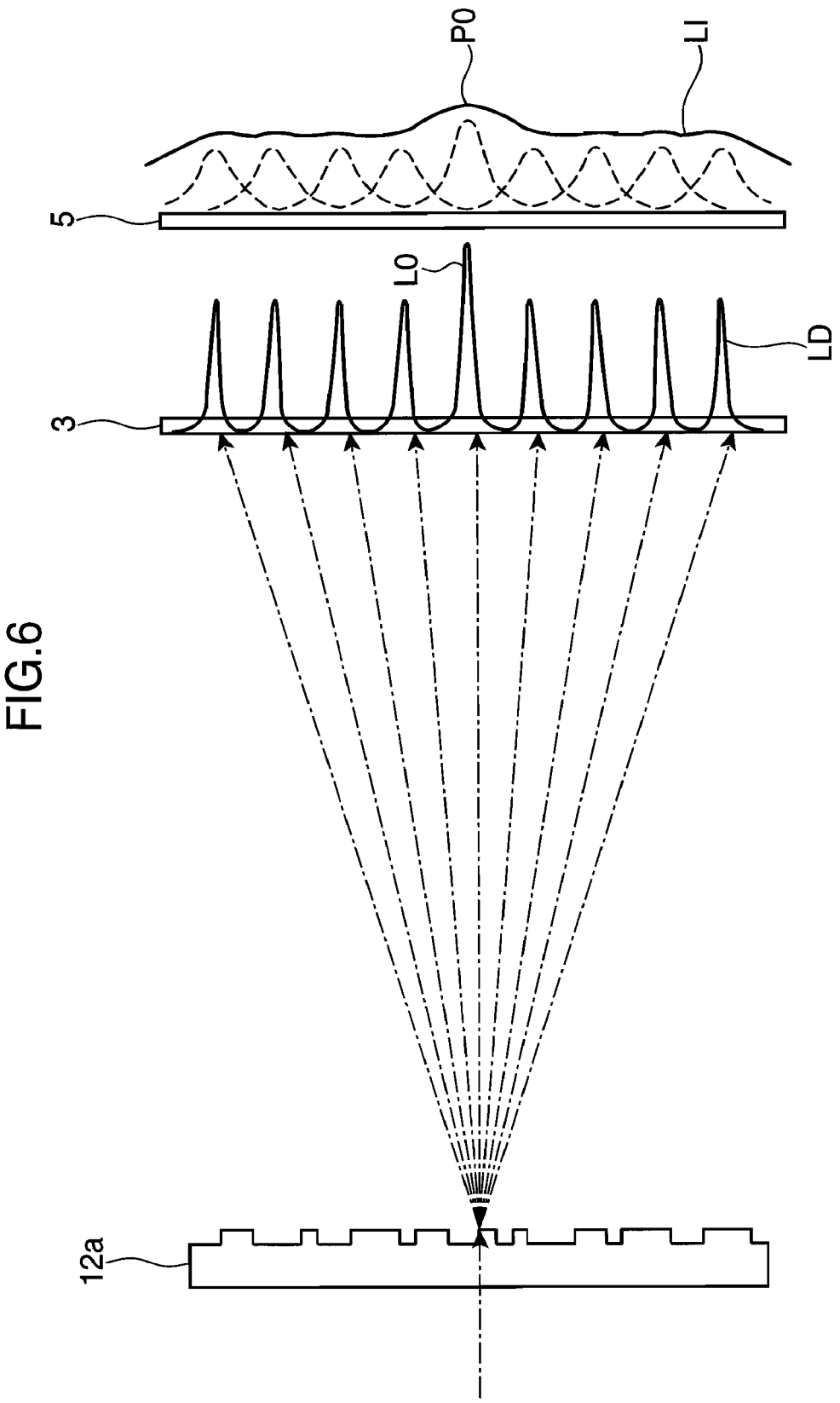
FIG. 6 is a diagram showing light intensity distribution nonuniformity by a $0^{th}$-order diffracted light of a holographic optical element shown in FIG. 5.

It is preferable to use a holographic optical element having first and second splitting surfaces for splitting an emission beam from the laser light source 1 at mutually different intervals as the 1-dimensional beam splitting grating 12. FIG. 6 is a diagram showing light intensity distribution nonuniformity cased by a $0^{th}$-order light of the holographic optical element 12a shown in FIG. 5. As shown in FIG. 6, a light intensity distribution LD on the diffusion plate 3 has a peak by a $0^{th}$-order diffracted light L0 and a peak P0 appears in a light intensity distribution LI on the spatial light modulation element 5 in the case of using the holographic optical element 12a. Thus, the light intensity distribution LI on the spatial light modulation element 5 becomes nonuniform.

Figure 7:
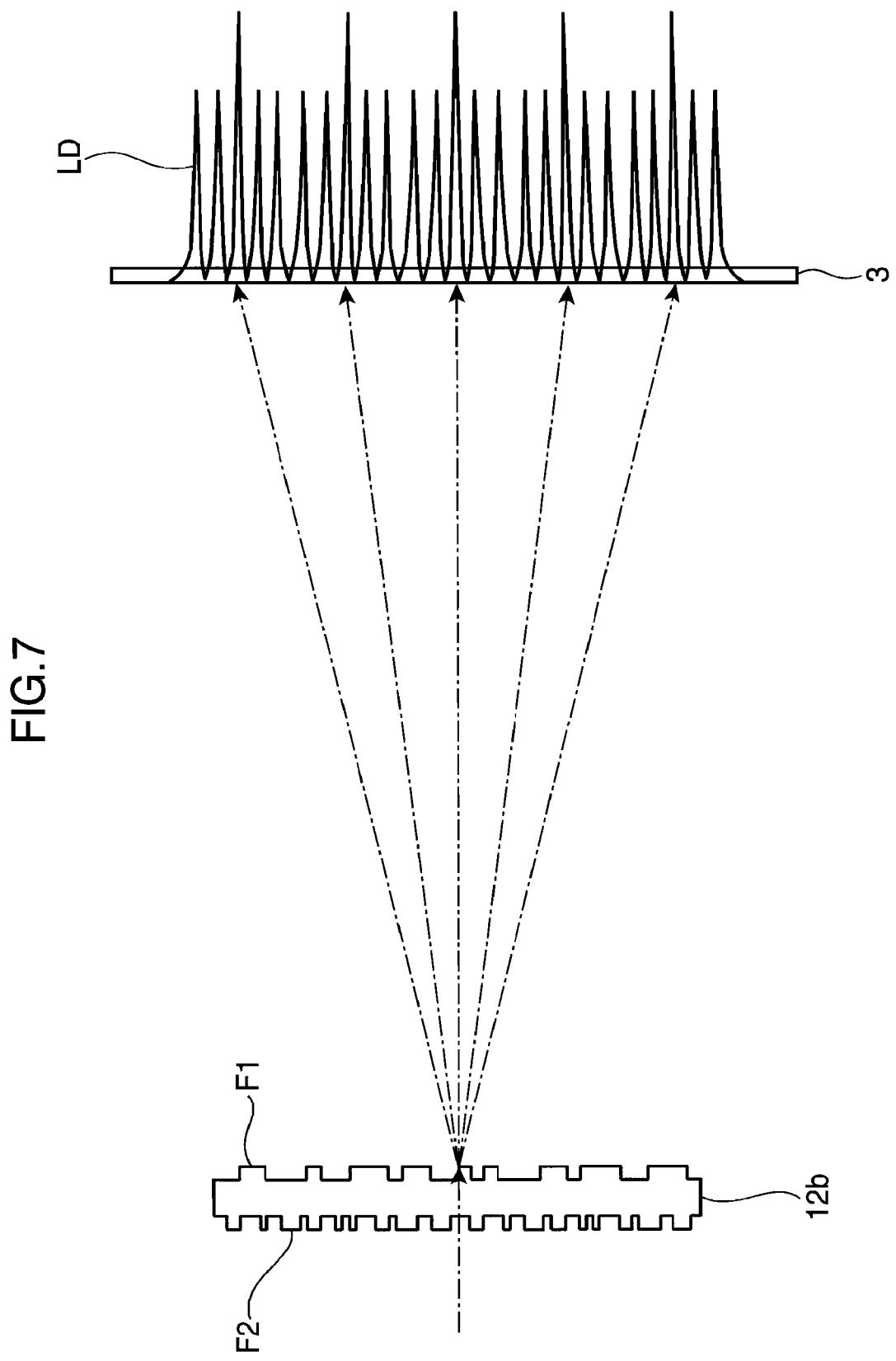
FIG. 7 is a diagram showing a light intensity distribution of a holographic optical element having first and second splitting surfaces for splitting an emission beam from a laser light source shown in FIG. 1 at mutually different intervals.
Figure 8:
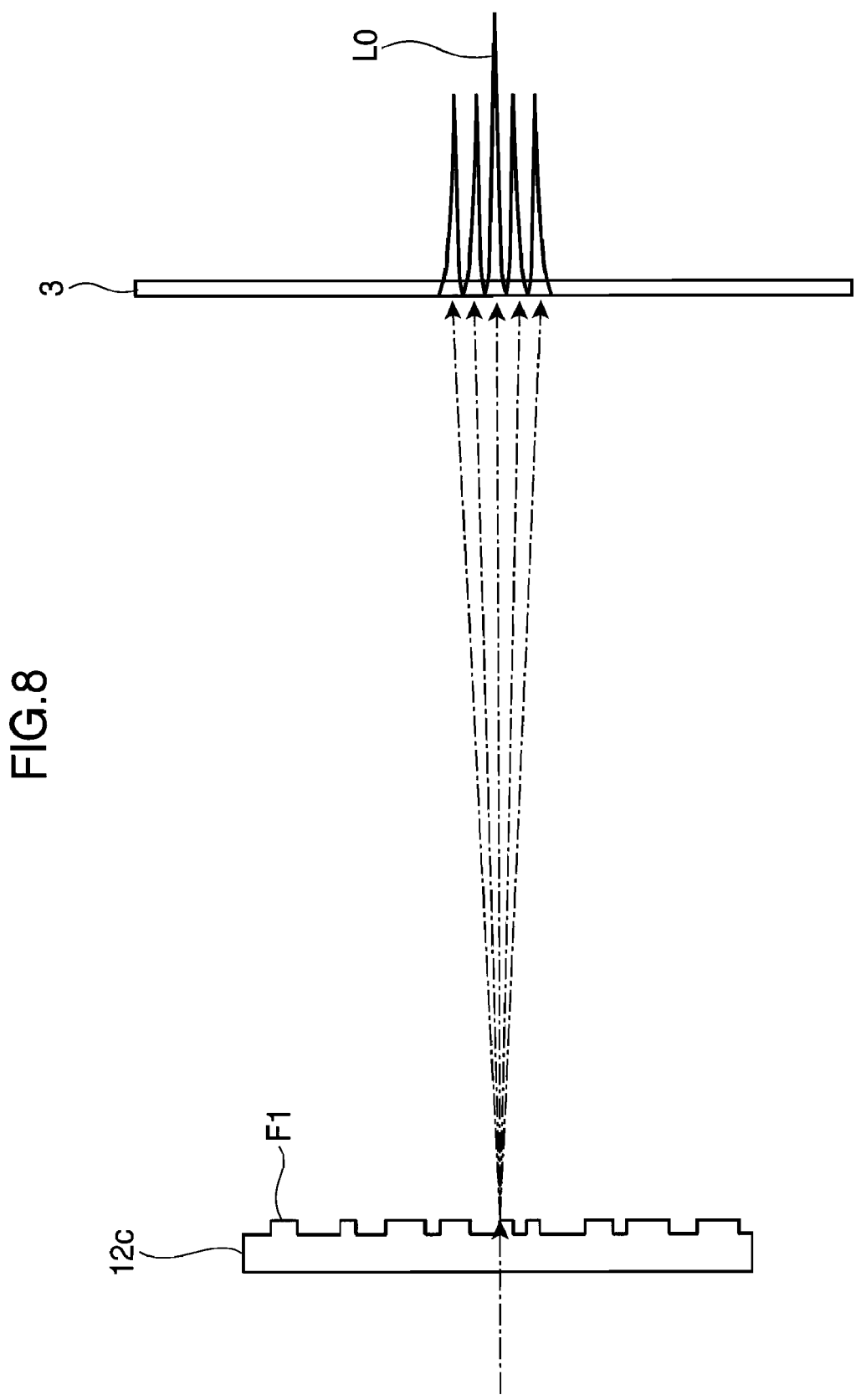
FIG. 8 is a diagram showing a light intensity distribution of a holographic optical element having only the first splitting surface shown in FIG. 7.
Figure 9:
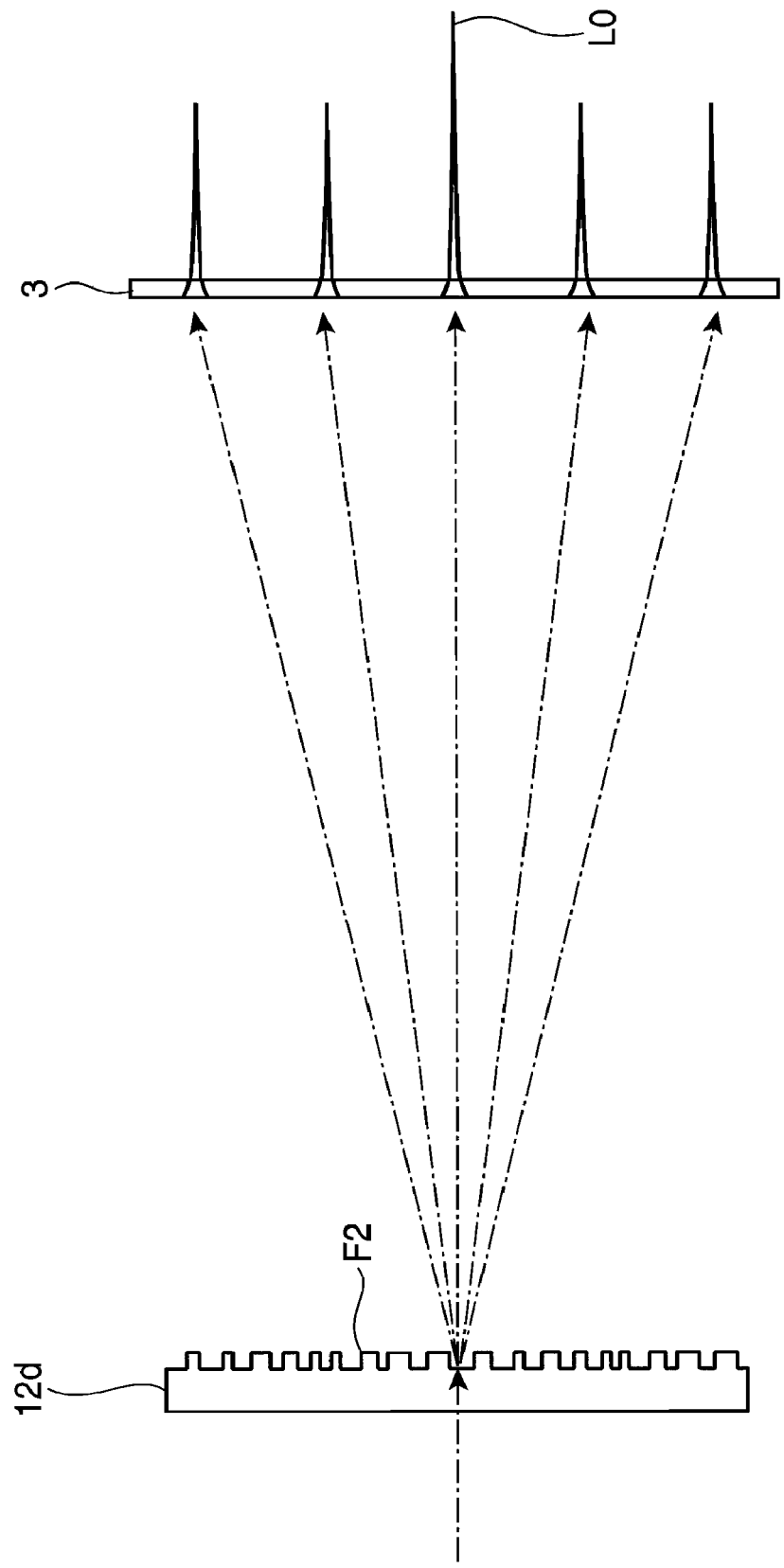
FIG. 9 is a diagram showing a light intensity distribution of a holographic optical element having only the second splitting surface shown in FIG. 7.

FIG. 7 is a diagram showing a light intensity distribution of a holographic optical element having first and second splitting surfaces for splitting an emission beam from the laser light source 1 shown in FIG. 1 at mutually different intervals, FIG. 8 is a diagram showing a light intensity distribution of a holographic optical element having only the first splitting surface shown in FIG. 7, and FIG. 9 is a diagram showing a light intensity distribution of a holographic optical element having only the second splitting surface shown in FIG. 7.

As shown in FIG. 7, a holographic optical element 12b has a first splitting surface F1 for splitting an emission beam from the laser light source 1 at first intervals and a second splitting surface F2 for splitting the emission beam from the laser light source 1 at second intervals wider than the first intervals. In the case of using a holographic optical element 12c having only the first splitting surface F1 as shown in FIG. 8, the $0^{th}$-order diffracted light L0 causes the nonuniformity of the light intensity distribution as shown. Also in the case of using a holographic optical element 12d having only the second splitting surface F2 as shown in FIG. 9, the $0^{th}$-order diffracted light L0 causes the nonuniformity of the light intensity distribution as shown.

However, since the first and second splitting surfaces F1, F2 are simultaneously used in the holographic optical element 12b shown in FIG. 7, the light intensity distributions of both are combined. As a result, the light intensity distribution on the diffusion plate 3 of the light beam split by the holographic optical element 12b becomes the light intensity distribution LD shown in FIG. 7, whereby the nonuniformity of the light intensity distribution caused by the $0^{th}$-order diffracted light can be made smaller. The first and second splitting surfaces are not particularly limited to those formed on the front and rear surfaces of the holographic optical element 12b as described above, and two, three or more of the holographic optical elements 12c, 12d shown in FIGS. 8 and 9 may be juxtaposed. These points also hold for other embodiments described later.

The method for 1-dimensionally expanding the light beam is not particularly limited to the above example, and it is also possible to use a cylindrical lens to be described later instead of the 1-dimensional beam splitting grating 12 of FIG. 4. In this case, a linear light beam illuminates the diffusion plate 3 instead of the light spot array LL.

Third Embodiment

Figure 10:
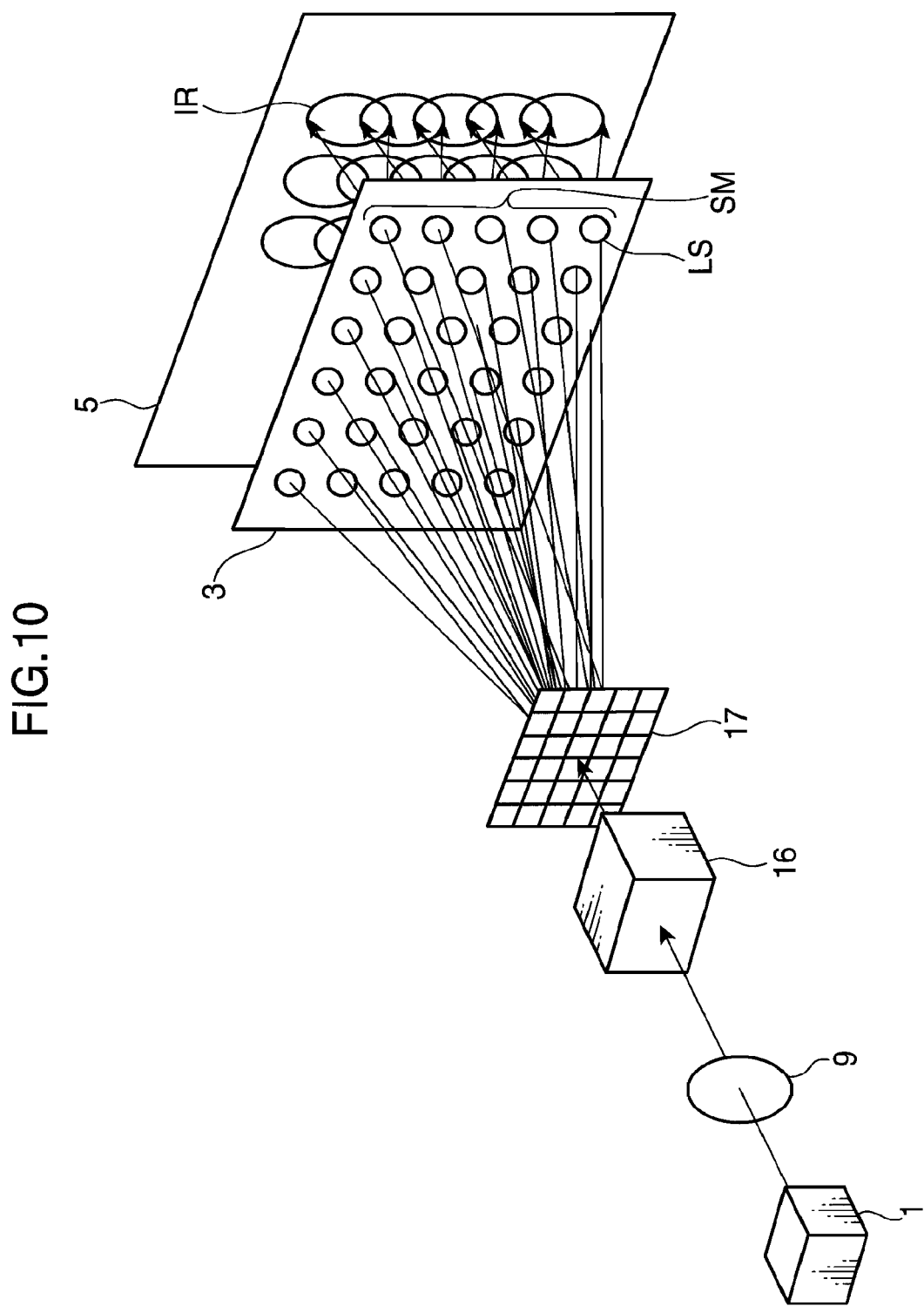
FIG. 10 is a schematic diagram showing the construction of an optical system for one color of a 2-dimensional image display device according to a third embodiment of the invention.

Next, a third embodiment of the present invention is described. FIG. 10 is a conceptual diagram of an optical system for one color extracted from a 2-dimensional image display device according to the third embodiment of the present invention. Since the 2-dimensional image display device according to the third embodiment is the same as the one shown in FIG. 1 except the construction shown in FIG. 10, the same parts are neither shown nor described in detail.

In the third embodiment, instead of the 2-dimensional beam scan unit 2 shown in FIG. 2, a 2-dimensional beam splitting grating 17 and a 2-dimensional fine angle beam scan unit 16 are used as shown in FIG. 10. In this construction, a light beam from a laser light source 1 is finely scanned in 2-dimensional directions in the 2-dimensional fine angle beam scan unit 16 and then incident on the 2-dimensional beam splitting grating 17 after passing through a condenser lens 9. The 2-dimensional beam splitting grating 17 is a diffraction grating having a 2-dimensional convexo-concave pattern formed on a transparent substrate made of, e.g. glass similar to the 1-dimensional beam splitting grating 12 of the second embodiment. The 1-dimensional beam splitting grating 12 has a 1-dimensional strip-like convexo-concave shape, whereas the surface shape of the 2-dimensional beam splitting grating 17 has a 2-dimensional distribution and can split an incident light beam into a multitude of light beams having the same power by optimizing the cross-sectional shape of the grating.

A conventional technology known as a diffractive optical element or a holographic optical element can be used for the 2-dimensional beam splitting grating 17, and its design method and production method are disclosed in detail, for example, "Diffractive Optics Design, Fabrication and Test" by Donald C O'Shea et al., SPIE PRESS (2004)ISBN:0-8194-5171-1.

A plurality of light beams split by the 2-dimensional beam splitting grating 17 become a 2-dimensional multibeam SM on the diffusion plate 3 by being arrayed in vertical and horizontal directions. At this time, since the light beam from the laser light source 1 is finely scanned in vertical and horizontal directions by the 2-dimensional fine angle beam scan unit 16, the 2-dimensional multibeam SM is also finely scanned in vertical and horizontal directions and, when an irradiation region IR on a spatial light modulation element 5 slightly changes, a phase pattern on a diffusion plate 3 changes to also change a speckle pattern generated on a screen 8.

In this way, the same effects as at the time of 2-dimensional scanning on the diffusion plate 3, i.e. the effects similar to those of the first embodiment can also be obtained in this embodiment. Further, in this embodiment, the beam is split to illuminate substantially the entire surface of the diffusion plate 3 by the 2-dimensional beam splitting grating 17, and a range scanned by the 2-dimensional fine angle beam scan unit 16 may be a small range having a dimension about equal to the spacing between the adjacent light spots. Since a beam scan angle becomes remarkably small in this embodiment, the miniaturization, lower cost, lower power consumption and lower noise of the 2-dimensional fine angle beam scan unit 16 can be realized.

Figure 11:
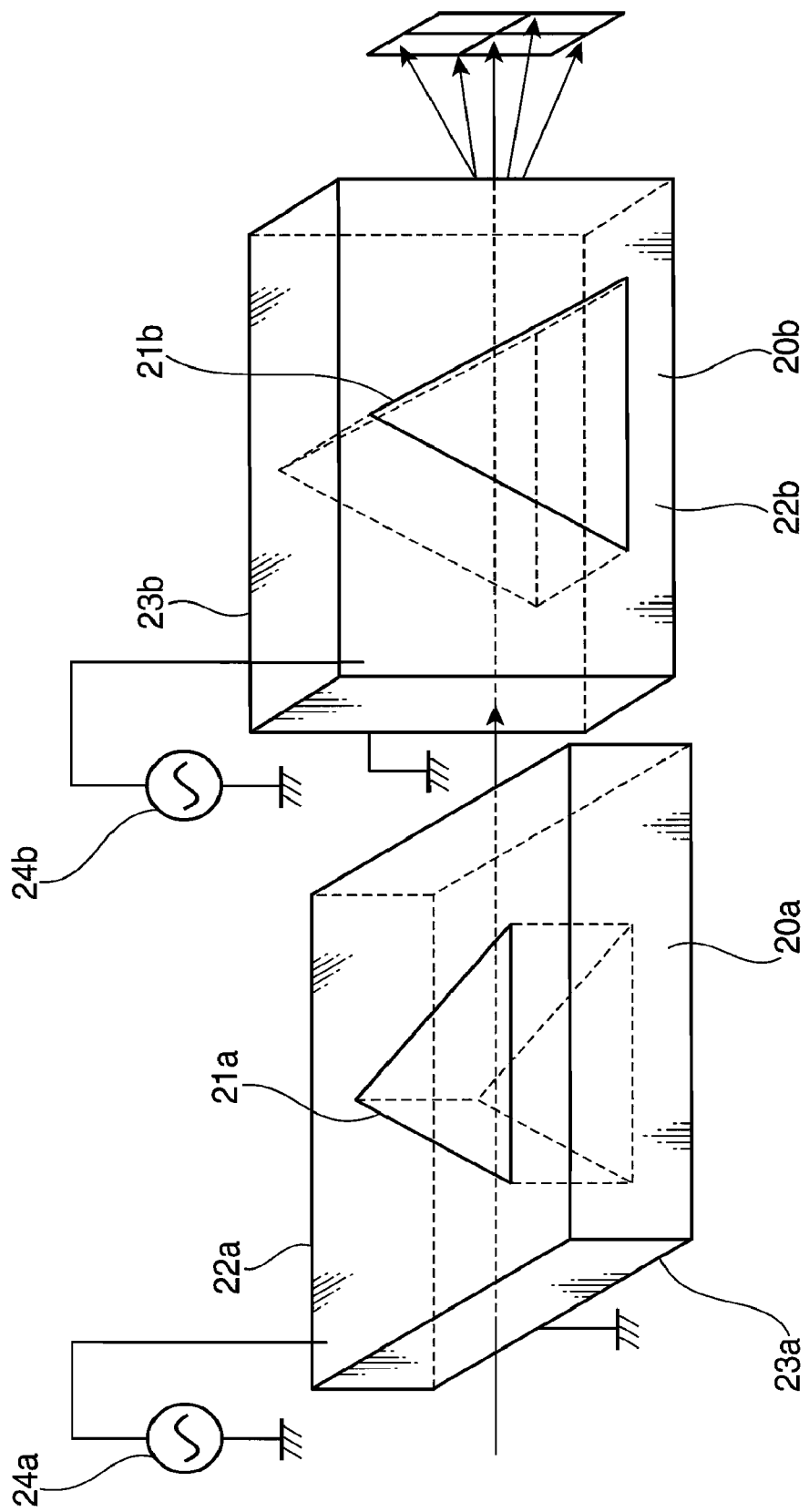
FIG. 11 is a diagram showing an example of an electro-optical deflection element using a polarization inversion element and used as a 2-dimensional fine angle beam scan unit shown in FIG. 10.

Further, an acousto-optic device having no large scan angle, an electro-optical deflection element using a polarization inversion element and the like can be used as the 2-dimensional fine angle beam scan unit 16. FIG. 11 is a diagram showing an example of an electro-optical deflection element using a polarization inversion element and used as the 2-dimensional fine angle beam scan unit 16 shown in FIG. 10.

Electro-optical crystal substrates 20a, 20b shown in FIG. 11 are polarization inversion elements, wherein the electro-optical crystal substrate 20a scans a light beam in horizontal direction and the electro-optical crystal substrate 20b scans the light beam, which is being scanned in horizontal direction, further in vertical direction upon the application of a specified alternating-current voltage.

For example, lithium niobate or lithium tantalate can be used as the material of the electro-optical crystal substrates 20a, 20b. The electro-optical crystal substrates 20a, 20b are carved out perpendicularly to optical axes thereof, and the polarizations of triangular regions within substrate surfaces are inverted to form polarization inversion regions 21a, 21b. Since the optical axes are inverted in the polarization inversion regions 21a, 21b, electro-optical effects having polarities opposite to those of surrounding regions are shown.

Further, top-surface electrodes 22a, 22b and under-surface electrodes 23a, 23b are formed on the top and under surfaces of the electro-optical crystal substrates 20a, 20b, and electric fields are applied in optical axis directions (directions normal to the substrates) by alternating-current power supplies 24a, 24b. At this time, as described above, a refractive index change occurs between the polarization inversion regions 21a, 21b and their surrounding areas by the electro-optical effects, and the electro-optical crystal substrates 20a, 20b act like prisms, so to speak, thereby being able to deflect the light passing through the substrates. Further, deflection in an opposite direction is possible by reversing an application direction of the electric field.

The characteristics of the electro-optical crystal substrates 20a, 20b are to be highly reliable, silent and speedy by having no movable portions. On the other hand, the disadvantage thereof is to require high voltages to ensure large angle of deflection. However, since an angle of deflection necessary for the 2-dimensional image display device of FIG. 10 is 1° or smaller, the light beam can be deflected in horizontal and vertical directions by the electro-optical crystal substrates 20a, 20b with practical drive voltages within this range.

Figure 12:
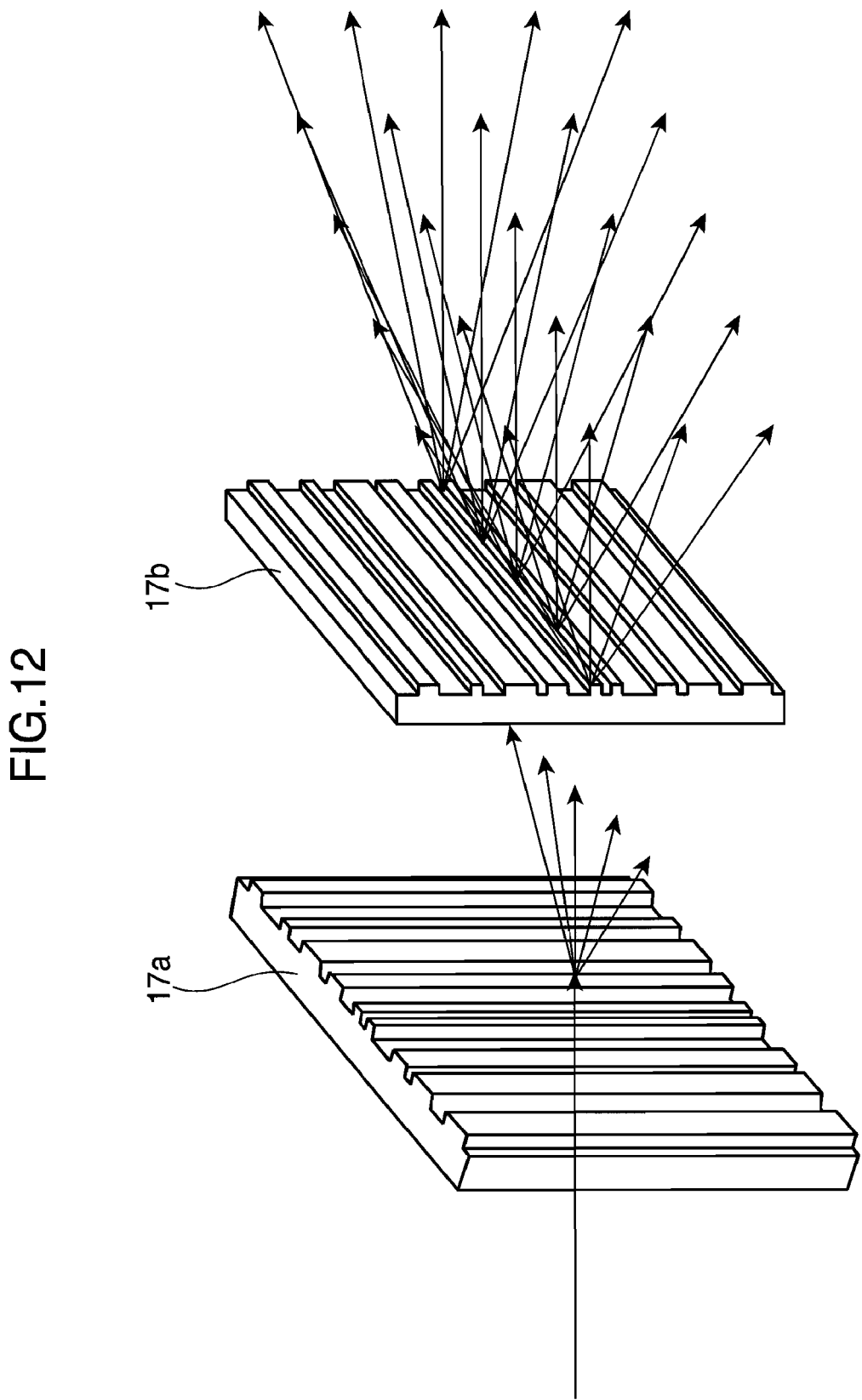
FIG. 12 is a perspective view showing an example of two 1-dimensional beam slitting gratings usable as a 2-dimensional beam splitting grating shown in FIG. 10.

The 2-dimensional beam splitting grating 17 is not particularly limited to the above example, and two 1-dimensional beam splitting gratings made of holographic optical elements may be used. FIG. 12 is a perspective view showing an example of two 1-dimensional beam splitting gratings usable as the 2-dimensional beam splitting grating 17 shown in FIG. 10. As shown in FIG. 12, a 1-dimensional beam splitting grating 17a splits an incident light beam into a plurality of light beams having the same power and arrayed in horizontal direction, and a 1-dimensional beam splitting grating 17b splits each of the plurality of beams split in horizontal direction into a plurality of light beams having the same power in vertical direction. As a result, similar to the 2-dimensional beam splitting grating 17, a 2-dimensional multibeam in which the plurality of light beams are arrayed in vertical and horizontal directions can be generated on the diffusion plate 3. As a result, the same effects as the 2-dimensional beam splitting grating 17 can be obtained and the nonuniformity of the light intensity distribution caused by the $0^{th}$-order diffracted light can be reduced similar to the holographic optical element 12b shown in FIG. 7.

Fourth Embodiment

Figure 13:
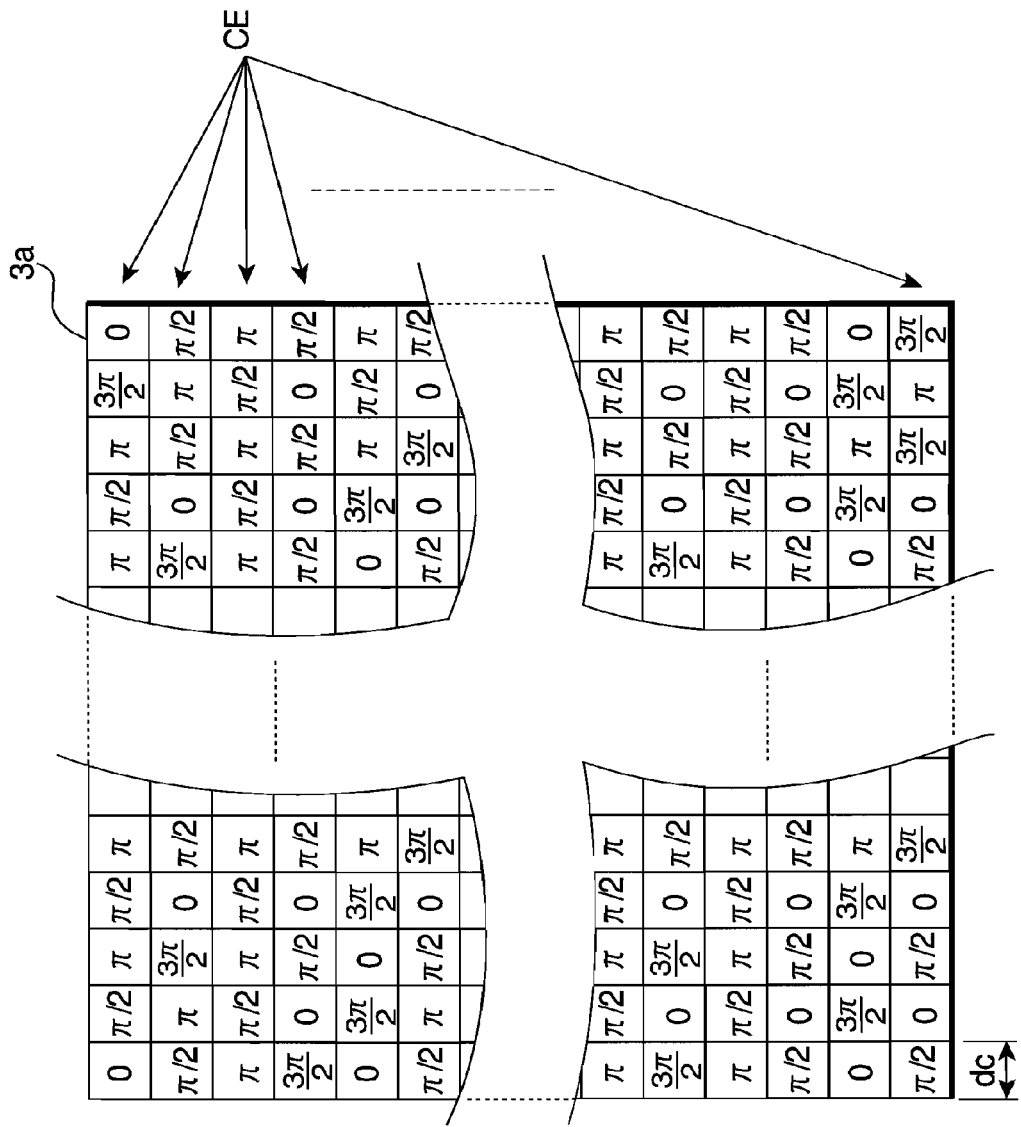
FIG. 13 is a diagram showing an example of a pseudo random diffusion plate used in a 2-dimensional image display device according to a fourth embodiment of the invention.

Next, a fourth embodiment of the present invention is described. FIG. 13 is a diagram showing an example of a pseudo random diffusion plate used in a 2-dimensional image display device according to the fourth embodiment of the present invention. Since the 2-dimensional image display device according to the fourth embodiment is the same as the one shown in FIG. 1 except the use of a pseudo random diffusion 3a plate shown in FIG. 13 as the diffusion plate 3, the same parts are neither shown nor described in detail.

The diffusion plate 3 shown in FIG. 2 is fabricated by randomly roughening the top surface of a transparent substrate normally made of glass, resin or the like, whereas the pseudo random diffusion plate 3a shown in FIG. 13 is fabricated by forming a latticed convexo-concave pattern on the top surface of a transparent substrate. The top surface of the pseudo random diffusion plate 3a is divided into 2-dimensional latticed cells CE, and the depths of the convexo-concave pattern are randomly set so that the phases of lights passing through the respective cells CE randomly change. The maximum depth may be set to $\lambda/(n-1)$.

An advantage of using the pseudo random diffusion plate 3a shown in FIG. 13 is that a diffusion angle of the light passing through the pseudo random diffusion plate 3a can be strictly controlled by the size of the cells CE. Specifically, the light is diffused to have an intensity distribution $I(\theta)=\{\sin(\alpha)/\alpha\}^2$ ($\alpha=\theta \times dc/(\pi \cdot \lambda)$) if dc and (denote the cell interval of the latticed cells CE and an angle. For example, in order to fabricate a diffusion plate whose full-angle-half-power is 10(, I(()=½ is substituted into the above equation to obtain the cell pitch dc corresponding to a wavelength (. For example, in the case of using blue, green and red light sources having wavelengths (=0.473, 0.532 and 0.640 micrometers respectively, fabrication may be made to have cell intervals dc of 2.4, 2.7 and 3.2 respectively.

On the other hand, since the surface shapes of normal diffusion plates are random, there are problems that (1) light utilization efficiency decreases because angles of diffusion locally differ depending on spots, (2) intensity distribution nonuniformity appears in an image because transmittance changes depending on spots and (3) it is difficult to stably fabricate in such a manner as to have a constant diffusion angle. The normal diffusion plates have another problem of disrupting a deflection direction when a large diffusion angle is taken. The pseudo random diffusion plate 3a shown in FIG. 13 can solve these problems.

The pseudo random diffusion plate 3a of FIG. 13 can be fabricated by forming a convexo-concave pattern on a glass plate by a photolithography method and an etching method used in a normal semiconductor process. At this time, if a phase transition is selected to be, for example, 0, $\pi/2$, $\pi$, $3\pi/2$ as in FIG. 13, the pseudo random diffusion plate 3a can be easily fabricated by two etching processes corresponding to the phase transitions to $\pi/2$ and to $\pi$.

Fifth Embodiment

Figure 14:
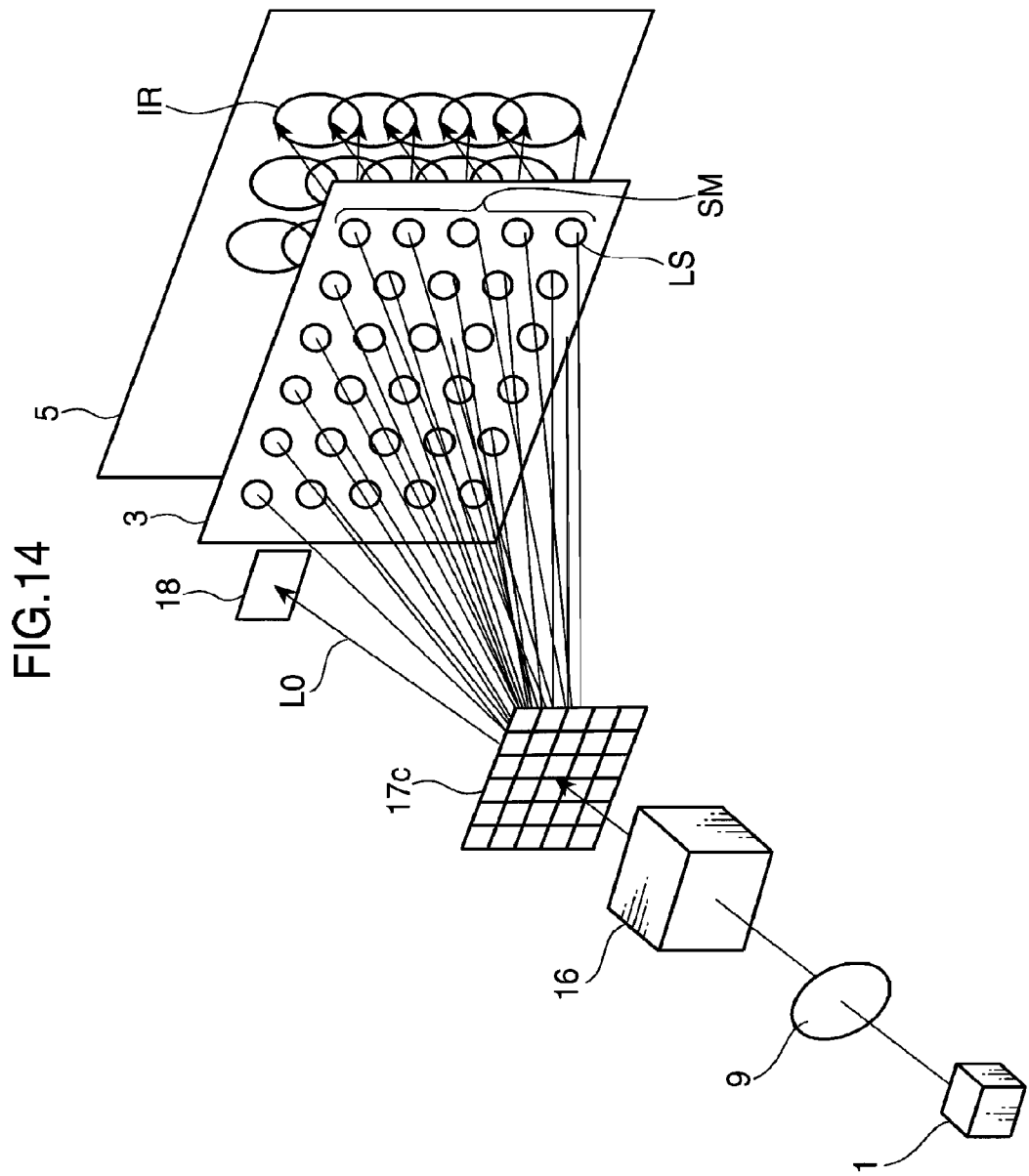
FIG. 14 is a schematic diagram showing the construction of an optical system for one color of a 2-dimensional image display device according to a fifth embodiment of the invention.

Next, a fifth embodiment of the present invention is described. FIG. 14 is a conceptual diagram of an optical system for one color extracted from a 2-dimensional image display device according to the fifth embodiment of the present invention. Since the 2-dimensional image display device according to the fifth embodiment is the same as the one shown in FIG. 1 except the construction shown in FIG. 14, the same parts are neither shown nor described in detail.

In the fifth embodiment, a blazed grating 17c and a light shielding plate 18 are used as shown in FIG. 14 instead of the 2-dimensional beam splitting grating 17 shown in FIG. 10.

In this construction, a light beam from a laser light source 1 is finely scanned in 2-dimensional directions in a 2-dimensional fine angle beam scan unit 16 and then incident on the blazed grating 17c after passing through a condenser lens 9. The blazed grating 17c is a 2-dimensional diffraction grating in which a 2-dimensional wedge-shaped pattern is formed on a transparent substrate made of, e.g. glass so that the respective grating surfaces (emergent surfaces) are inclined with respect to the incident surface similar to the 2-dimensional beam splitting grating 17 of the third embodiment. Accordingly, out of the light beam emerging from the blazed grating 17c, only a $0^{th}$-order diffracted light is introduced in a direction normal to the incident surface (in the central axis direction of the blazed grating 17c) to be incident on the light shielding plate 18. On the other hand, the remaining diffracted lights are deflected by a specified angle in rightward direction (toward the right side in FIG. 14) to be incident on a diffusion plate 3 located at a position displaced only by a specified distance from the central axis of the blazed grating 17c in rightward direction. Since the action after the diffusion plate 3 is similar to the one in the third embodiment, it is not described.

Figure 15:
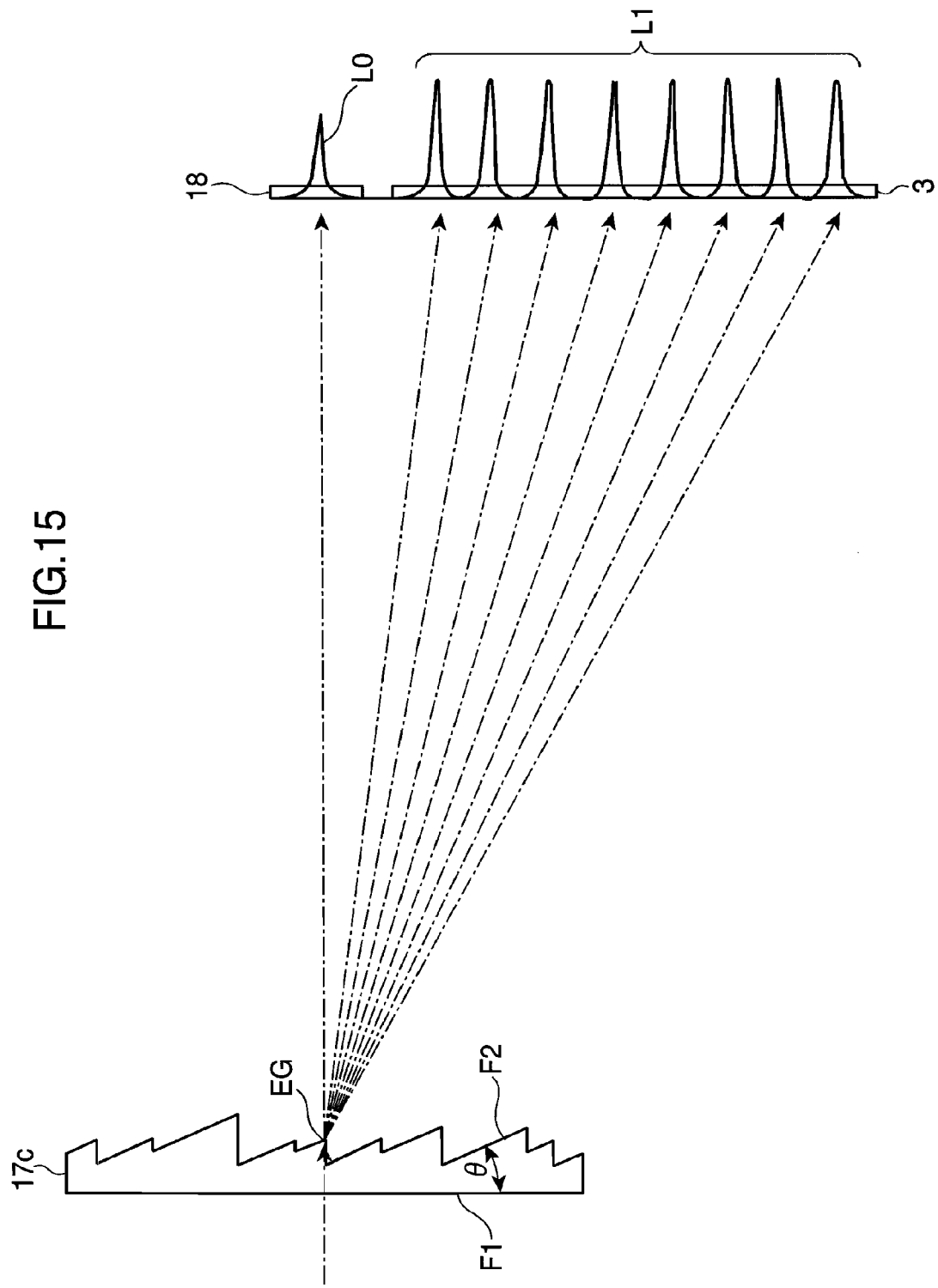
FIG. 15 is a diagram showing a light intensity distribution of diffracted lights of a blazed grating shown in FIG. 14.

FIG. 15 is a diagram showing a light intensity distribution of the diffracted lights of the blazed grating 17c shown in FIG. 14. As shown in FIG. 15, the blazed grating 17c has a plurality of grating surfaces F2 having randomly different heights, and an angle defined between the respective grating surfaces F2 and an incident surface F1 is set to a specified angle θ (e.g. 30°). If a light beam is incident on the blazed grating 17c formed as above, a $0^{th}$-order diffracted light L0 emerging from an edge portion EG of each grating surface irradiates the light shielding plate 18 and diffracted lights L1 other than the $0^{th}$-order diffracted light irradiate the diffusion plate 3 with a uniform light intensity distribution as shown.

As described above, in this embodiment, effects similar to those of the third embodiment can be obtained and, since the $0^{th}$-order diffracted light irradiates neither the diffusion plate 3 nor the spatial light modulation element 5, the light intensity distribution on the spatial light modulation element 5 can be made more uniform.

Sixth Embodiment

Figure 16:
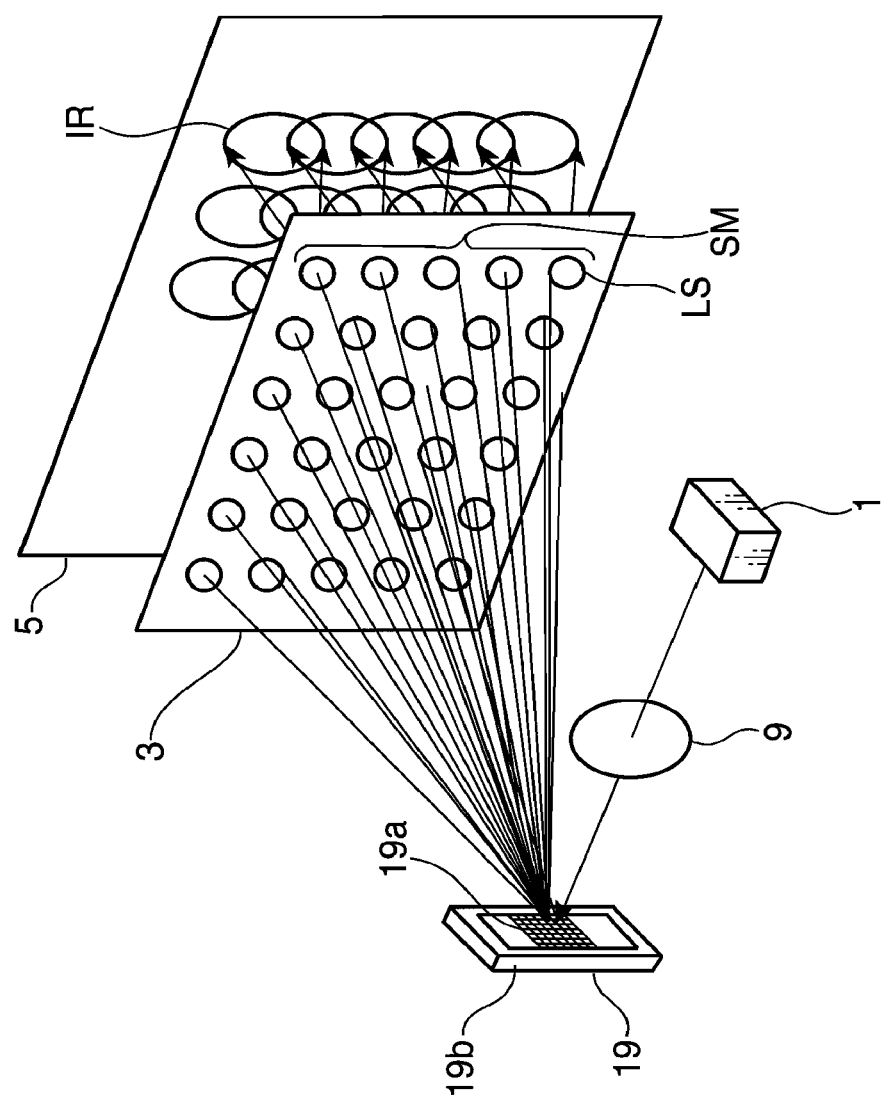
FIG. 16 is a schematic diagram showing the construction of an optical system for one color of a 2-dimensional image display device according to a sixth embodiment of the invention.

Next, a sixth embodiment of the present invention is described. FIG. 16 is a conceptual diagram of an optical system for one color extracted from a 2-dimensional image display device according to the sixth embodiment of the present invention. Since the 2-dimensional image display device according to the sixth embodiment is the same as the one shown in FIG. 1 except the construction shown in FIG. 16, the same parts are neither shown nor described in detail.

In the sixth embodiment, a beam vibrator 19 for vibrating a 2-dimensional beam splitting grating 19a is used as shown in FIG. 16 instead of the 2-dimensional beam scan unit 2 shown in FIG. 2. In this construction, a light beam from a laser light source 1 is reflected by the 2-dimensional beam splitting grating 19a of the beam vibrator 19 to be introduced to a diffusion plate 3 after passing through a condenser lens 9.

The beam vibrator 19 includes a vibratory mirror such as a MEMS (Micro Electro Mechanical Systems) mirror, and is constructed such that the 2-dimensional beam splitting grating 19a formed on a mirror surface is so supported on a support 19b as to be capable of 1-dimensional or 2-dimensional minute vibration. Thus, the 2-dimensional beam splitting grating 19a is 1-dimensionally or 2-dimensionally minutely vibrated similar to a MEMS mirror to be described later. The 2-dimensional beam splitting grating 19a is a diffraction grating having a 2-dimensional convex-concave pattern formed on the mirror surface similar to the 2-dimensional beam splitting grating 17 shown in FIG. 10, and reflects an incident beam to split it into a multitude of light beams having the same power.

A plurality of light beams split by the 2-dimensional beam splitting grating 19a become a 2-dimensional multibeam SM on the diffusion plate 3 by being arrayed in vertical and horizontal directions. At this time, since the 2-dimensional beam splitting grating 19a is minutely vibrated by the beam vibrator 19, the 2-dimensional multibeam SM is also minutely scanned in vertical and/or horizontal direction and, when an irradiation region IR on a spatial light modulation element 5 slightly changes, a phase pattern on the diffusion plate 3 changes to also change a speckle pattern generated on a screen 8.

As described above, in this embodiment, effects similar to those of the first embodiment can be obtained and, since the 2-dimensional beam splitting grating 19a is integral to the beam vibrator 19, the number of components can be reduced and the device can be further miniaturized.

Seventh Embodiment

Figure 17:
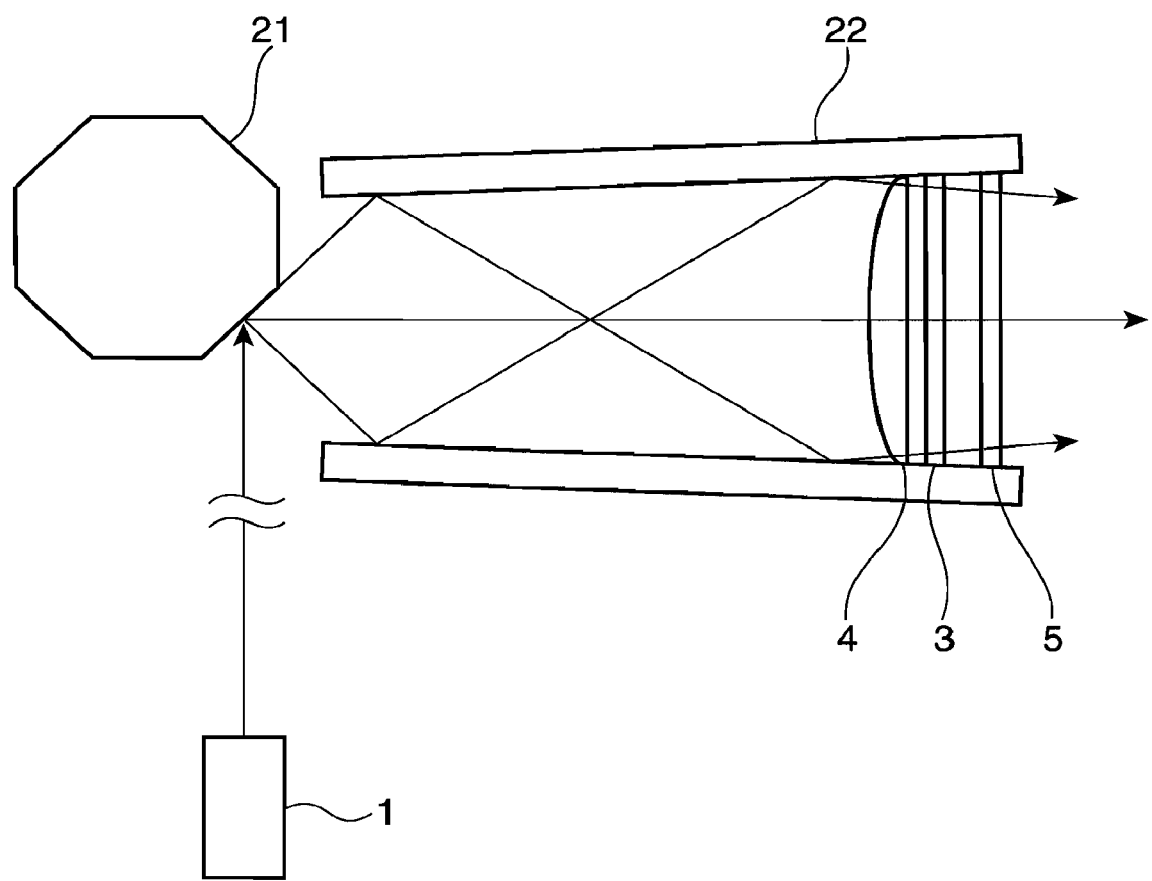
FIG. 17 is a schematic diagram showing the construction of an optical system for one color of a 2-dimensional image display device according to a seventh embodiment of the invention.

Next, a seventh embodiment of the present invention is described. FIG. 17 is a conceptual diagram of an optical system for one color extracted from a 2-dimensional image display device according to the seventh embodiment of the present invention. Since the 2-dimensional image display device according to the seventh embodiment is the same as the one shown in FIG. 1 except the construction shown in FIG. 17, the same parts are neither shown nor described in detail. Further, in order to facilitate the diagrammatic representation, only a polygon scanner is shown as a 2-dimensional scan unit.

In the seventh embodiment, a polygon scanner 21 and a galvanometer mirror (or polygon scanner, not shown) are used as a 2-dimensional beam scan unit 2, and reflection mirrors 22 are added to surround an optical path between the polygon scanner 21 and a diffusion plate 3 and an optical path between the diffusion plate 3 and a spatial light modulation element 5.

In this construction, a light beam from a laser light source 1 is reflected by the galvanometer mirror to be scanned and is further reflected by the polygon scanner 21 to be scanned. The light beam reflected by the polygon scanner 21 is reflected a plurality of times between the reflection mirrors 22 and finally introduced to a field lens 4, the diffusion plate 3 and the spatial light modulation element 5. As a result, effects similar to those of the first embodiment can be obtained in this embodiment as well.

Here, in the case of a polygon mirror having a small number of reflection surfaces, e.g. eight surfaces like the polygon scanner 21, a scan angle of the light beam becomes larger, wherefore it becomes difficult to design the optical system without being able to ensure a sufficient distance between the polygon scanner 21 and the spatial light modulation element 5. On the other hand, since the light beam is reflected by the reflection mirrors in this embodiment, a sufficient distance can be ensured between the polygon scanner 21 and the spatial light modulation element 5 and, hence, the optical system can be easily designed. Generally, a polygon scanner having a smaller number of reflection surfaces is easier to fabricate and has lower cost.

Further, since the polygon scanner 21 has a rotating mechanism to make rotary motions in one direction, the scan speed of the light beam can be made constant from the start to the end and the light intensity distribution on the spatial light modulation element 5 can be made more uniform as compared to a vibrating mechanism to make reciprocal motions. Furthermore, since the optical path between the polygon scanner 21 and the diffusion plate 3 and the one between the diffusion plate 3 and the spatial light modulation element 5 are covered by the reflection mirrors 22, the loss of the light beam in this part can be prevented and the light intensity distribution on the spatial light modulation element 5 can be improved.

Although the example of using the 2-dimensional beam scan unit and the reflection mirrors 22 is shown above, similar effects can be obtained even if reflection mirrors are used with a 1-dimensional beam scan unit, a 1-dimensional beam splitting portion and the like.

Eighth Embodiment

Figure 18:
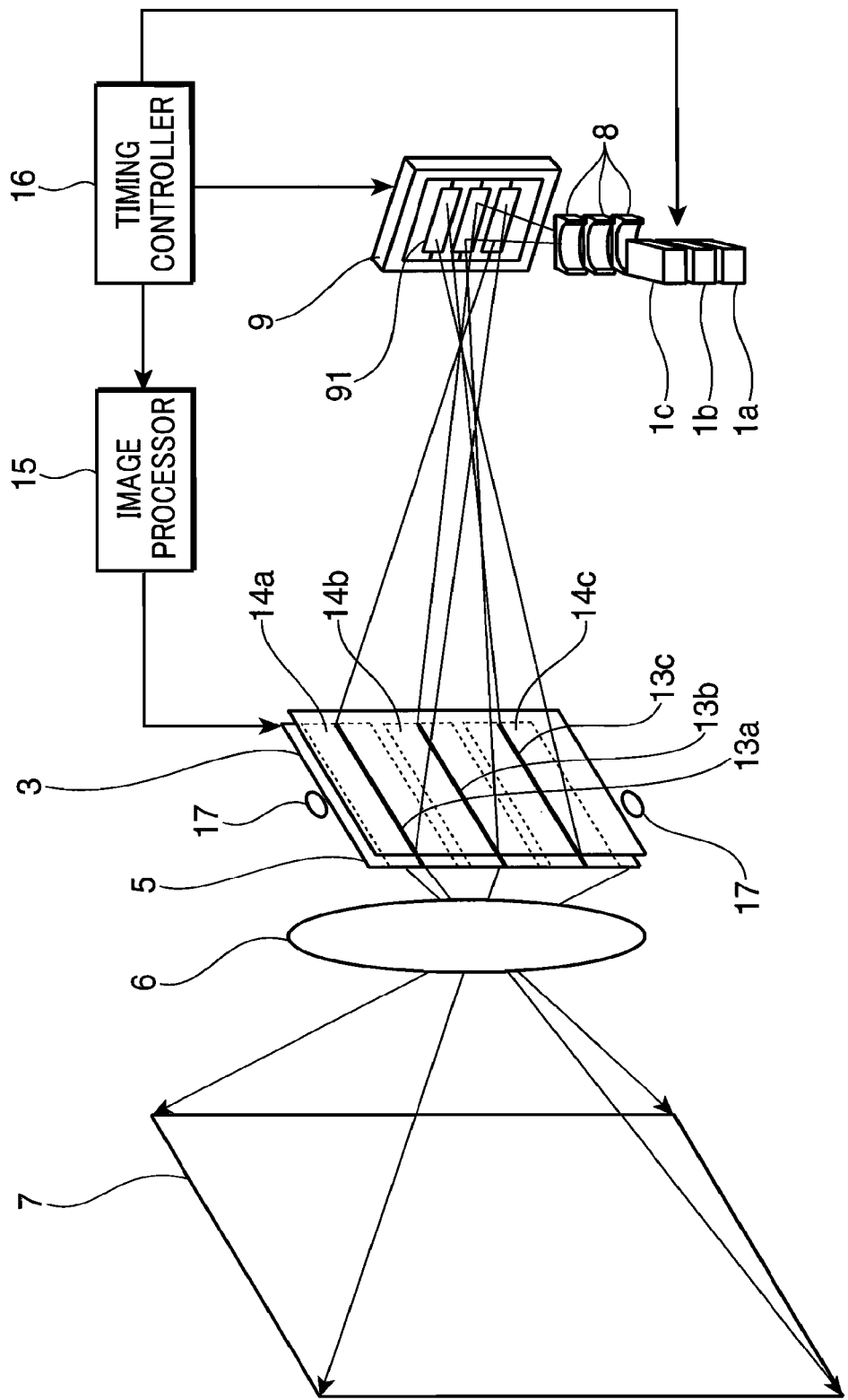
FIG. 18 is a schematic diagram showing the construction of a 2-dimensional image display device according to an eighth embodiment of the invention.

Next, an eighth embodiment of the present invention is described. FIG. 18 is a schematic construction diagram of a 2-dimensional image display device according to the eighth embodiment of the present invention. Lights emitted from a red laser light source 1a, a green laser light source 1b and a blue laser light source 1c are expanded in horizontal direction by concave lenses 8 to irradiate a MEMS mirror 9. The MEMS mirror 9 has three mirror portions 91 whose vertical angles are independently variable, and the lights emitted from the red laser light source 1a, the green laser light source 1b and the blue laser light source 1c are incident on the respective mirror portions 91. The lights reflected by the mirror portions 91 pass through a diffusion plate 3 disposed before and proximate to a spatial light modulation element 5 and illuminate the spatial light modulation element 5 as linear beams 13a, 13b and 13c. The lights modulated by the spatial light modulation element 5 are projected onto a screen 7 by a projection lens 6 to form an image.

Figure 19:
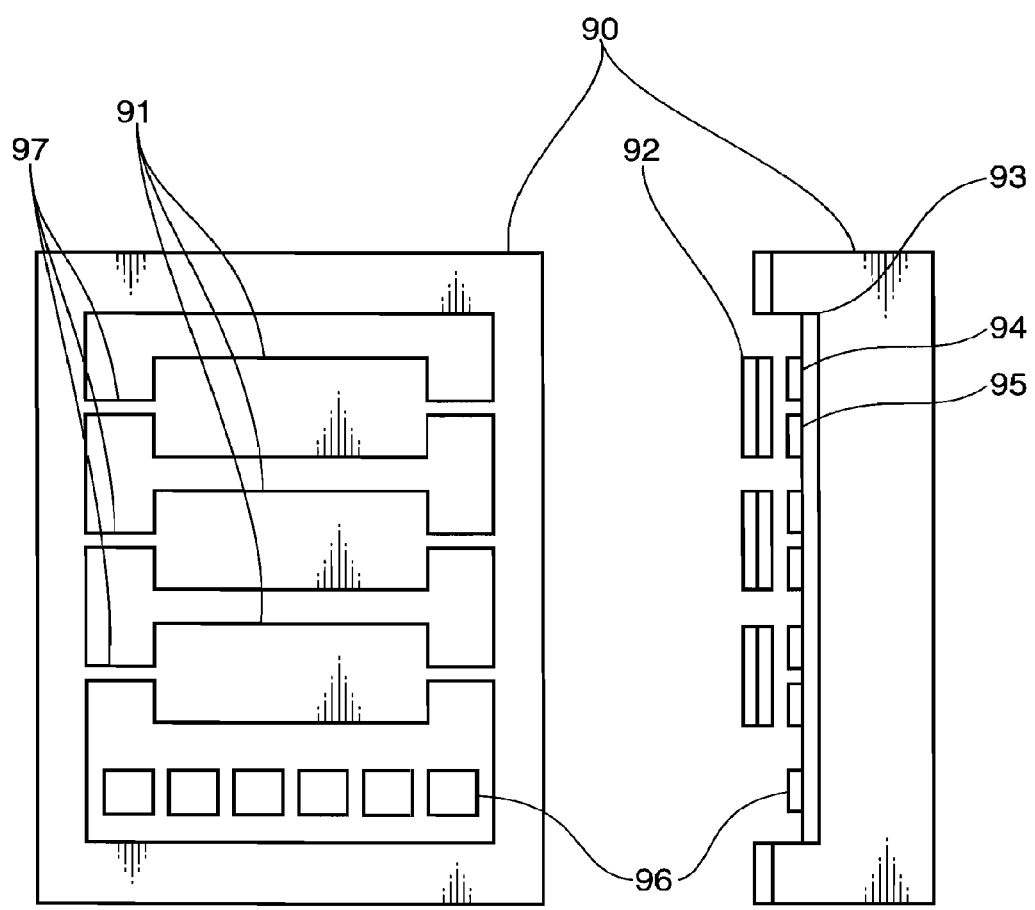
FIG. 19 is a schematic diagram showing the construction of a MEMS mirror shown in FIG. 18.

FIG. 19 is a schematic construction diagram of the MEMS mirror 9 shown in FIG. 18. The MEMS mirror 9 is formed by adhering the mirror portions 91 formed integral to supports 97 to a silicon substrate 90 having upper electrodes 94, lower electrodes 95 and a bonding pad 96 formed in a recess thereof via an insulation film 93. The mirror portions 91 and the silicon substrate 90 having such structures can be fabricated using the photolithography technology and the etching technology.

The mirror portions 91 are connected to the silicon substrate 90 via the supports 97. Below the mirror portions 91, the upper electrodes 94 and the lower electrodes 95 are formed on the silicon substrate 90 via the insulation film 93. The respective electrodes are electrically connected to the bonding pad 96, but wirings therebetween are not shown for simplicity. Reflection films 92 for improving reflectance are mounted above the mirror portions 91.

An electrically conductive material is used for the silicon substrate 90, and an electrostatic force acts in a direction to bring the silicon substrate 90 and the upper electrode 94 toward each other and the mirror portion 91 is so inclined as to face upward upon the application of a voltage between the silicon substrate 90 and the upper electrode 94. Conversely, upon the application of a voltage between the silicon substrate 90 and the lower electrode 95, an electrostatic force acts in a direction to bring the silicon substrate 90 and the lower electrode 95 toward each other and the mirror portion 91 is so inclined as to face downward. A moment of force in a direction to rotate the mirror portion 91 is determined by a difference between the voltage between the upper electrode 94 and the silicon substrate 90 and the voltage between the lower electrode 95 and the silicon substrate 90.

If the mirror portion 91 is inclined, the support 97 is twisted and a moment of force acts in such a direction as to reduce the inclination. If a direct-current voltage is applied to the upper electrode 94 and the lower electrode 95, the angle of the mirror portion 91 is so determined as to balance out an electrostatic force and a torsional moment. In order to dynamically control the angle of the mirror portion 91 as in the 2-dimensional image display device of this embodiment, the time waveform of the applied voltage is determined in consideration of the inertia moment of the mirror portion 91 and the air resistance of the mirror portion 91 in addition to the electrostatic force and the torsional stress of the support 97.

The MEMS mirror 9 formed with the mirror portions 91 with a width of 800 microns and a length of 3 mm was fabricated. A primary resonance frequency in this case was 25 kHz. Pulse voltages were applied in opposite directions near a scan starting position and near a scan ending position as drive voltages so as to enable linear scanning at high speed in relation to time. The timings of the applied pulses were controlled in accordance with a signal from a photodetector 17. As a result, the MEMS mirror 9 having good scanning characteristics could be fabricated.

The upper and lower electrodes 94, 95 can also be used as a detector for an angle of rotation by not only applying the drive voltages thereto as described above, but also detecting an electrostatic capacity between the respective electrodes 94, 95 and the mirror portion 91. For example, the angle of rotation of the mirror portion 91 can be known by detecting a current value with a high-frequency voltage applied to the respective electrodes. By using the MEMS mirror 9 for the detection of the angle of rotation of the mirror in this way, the 2-dimensional image display device may be realized by a simple construction without using the aforementioned photodetector 17.

Although the MEMS mirror 9 using an electrostatic force as a drive force is taken as an example in this embodiment, any construction is applicable provided that it can scan a light beam. For example, a beam scanning mechanism using the Lorentz force of a magnetic coil may be used. In this case, a counter voltage of the coil is detected to detect the rotating speed of the mirror portion 91, and the detection result can be used for the angle control of the mirror portion 91. It is also possible to utilize a beam scanning mechanism taking advantage of electrostrictive effects brought about by the use of a piezoelectric film. In this case, the angle of rotation of the mirror portion 91 can be detected utilizing the piezoelectric effects of the piezoelectric film and the detection result can be used for the angle control of the mirror portion 91.

A feature of this embodiment is that images of red, green and blue lights can be projected onto the screen using one spatial light modulation element 5 by a method described below to obtain a full color image.

The angles of rotation of the three mirror portions 91 provided in the MEMS mirror 9 are vertically variable, and these respective angles are independently controlled by a timing controller 16. The red laser beam, the green laser beam and the blue laser beam incident on the respective mirror portions 91 are projected to have linear shapes at different vertical positions on the spatial light modulation element 5. An image processor 15 separates a video signal inputted from the outside into a red video signal, a green video signal and a blue video signal, and feeds the different video signals to different vertical regions of the spatial light modulation element 5. In other words, out of the video signal, signals corresponding to the respective color images are fed to the regions to be irradiated by the respective laser beams.

The linear beams 13*a* to 13*c* on the spatial light modulation element 5 vertically move on the spatial light modulation element 5 as the mirror portions 91 of the MEMS mirror 9 are driven. At this time, the timing controller 16 controls the image processor 15 and the MEMS mirror 9 so that a red image 14*a* is constantly displayed in the region of the spatial light modulation element 5 irradiated with the red linear beam 13*a*, a green image 14*b* is constantly displayed in the region of the spatial light modulation element 5 irradiated with the green linear beam 13*b* and a blue image 14*c* is constantly displayed in the region of the spatial light modulation element 5 irradiated with the blue linear beam 13*c*.

Figure 20:
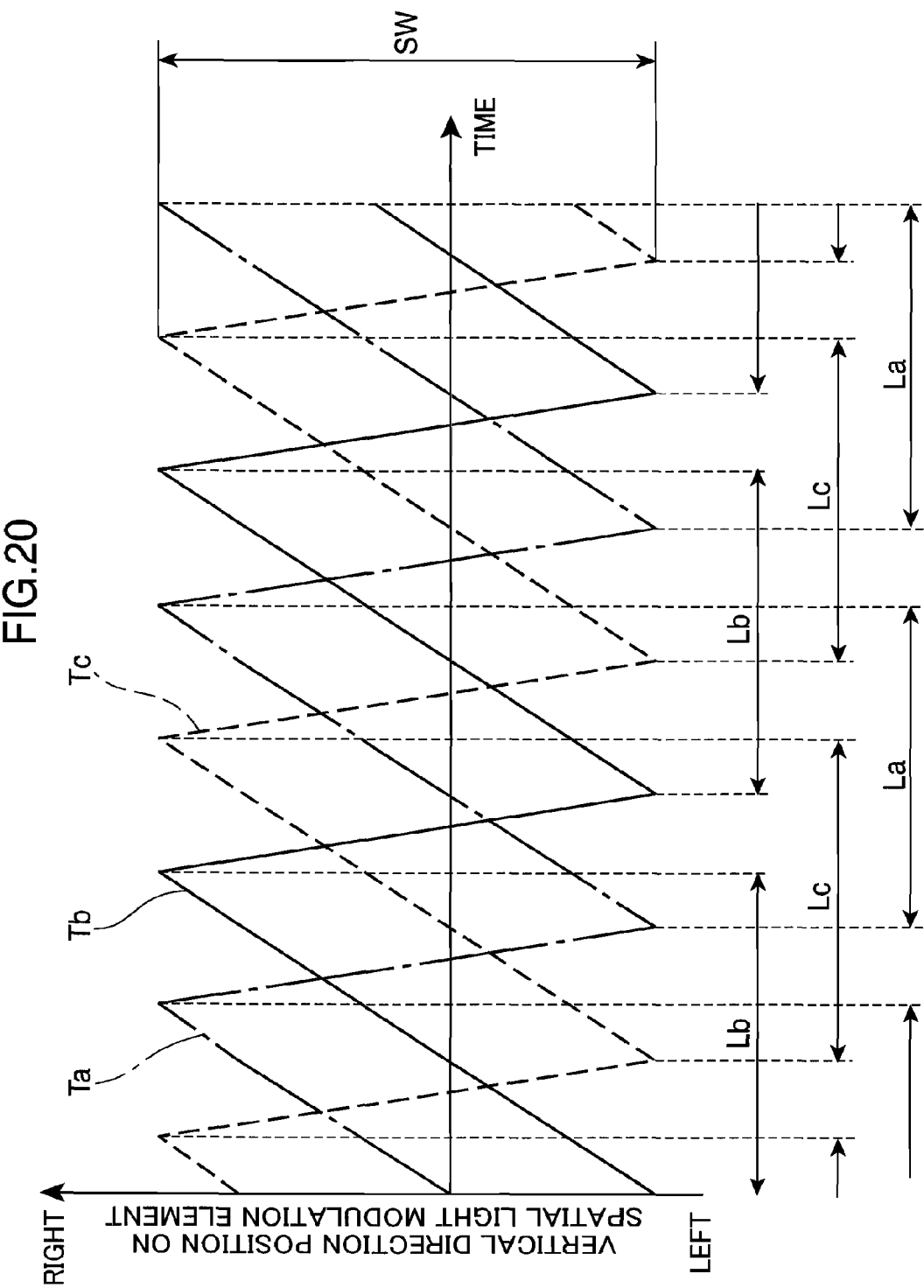
FIG. 20 is a diagram showing a linear beam scanning method in the 2-dimensional image display device shown in FIG. 18.

A state of scanning the linear beams 13*a* to 13*c* at this time is conceptually shown in FIG. 20. Tracks Ta, Tb and Tc respectively shown in dashed dotted line, solid line and broken line represent the tracks of the red linear beam 13*a*, the green linear beam 13*b* and the blue linear beam 13*c*, and the red, green and blue linear beams 13*a*, 13*b* and 13*c* are driven to have triangular waveforms on the spatial light modulation element 5. It is ideally desirable to drive them to have sawtooth waveforms, but it is not possible to instantaneously move the mirror portions 91 of the MEMS mirror 9 due to the rotational moments thereof and the mirror portions 91 are actually driven by asymmetric triangular waveforms as shown and the positions of the linear beams 13*a* to 13*c* accordingly change along asymmetric triangular paths. FIG. 20 is a schematic diagram. In reality, the motions of the beams are disrupted, for example, due to overshoots seen at turn-round positions due to the inertia moments of the mirror portions 91. The triangular tracks are shown as the tracks of the respective linear beams 13*a* to 13*c* without showing these disrupted points.

In the example of FIG. 20, the respective linear beams 13*a* to 13*c* are scanned to illuminate the spatial light modulation element 5 while being moved from the left side (lower side in FIGS. 18 and 20) toward the right side (upper side in FIGS. 18 and 20) on the spatial light modulation element 5. When the respective linear beams 13*a* to 13*c* reach the rightmost side of the spatial light modulation element 5, the timing controller 16 turns off the laser light sources 1*a* to 1*c* emitting the respective beams and causes the MEMS mirror 9 to move the respective linear beams 13*a* to 13*c* to the rightmost side of the spatial light modulation element 5 at high speeds.

Specifically, the timing controller 16 causes the laser light sources to emit the respective beams when the respective tracks Ta, Tb and Tc are diagonally right up while prohibits the laser light sources from emitting the respective beams when the respective tracks Ta, Tb and Tc are diagonally right down. By a control as described above, the red laser light source 1a, the green laser light source 1b and the blue laser light source 1c are successively turned on during light emission periods La to Lc, respectively, and the respective linear beams 13a to 13c constantly irradiate different positions on the spatial light modulation element 5 without right-up parts of the respective tracks Ta, Tb and Tc crossing each other as shown in FIG. 20.

At this time, the timing controller 16 turns on or off switching elements at the positions of the spatial light modulation element 5 irradiated with the respective linear beams 13a to 13c in accordance with the video signals corresponding to the colors of the linear beams 13a to 13c, whereby an image is displayed on the screen 7. Thus, bright red, green and blue lines are displayed on the screen 7 moment by moment, but the red, green and blue images are simultaneously projected onto the screen 7 by the afterimage effect by scanning the respective linear beams 13a to 13c at high speeds, wherefore a full color image can be displayed.

Another feature of this embodiment is that the emission periods La to Lc, during which the respective linear beams 13a to 13c are emitted, are sufficiently longer than periods, during which they are not emitted, to enable the display of a bright image. For example, according to a method for successively displaying a red image, a green image and a blue image on the entire surface of the spatial light modulation element 5 and causing the red, green and blue light sources to successively irradiate the entire surface of the spatial light modulation element 5 in synchronism with a displayed image, a time during which the respective light sources are turned on is ⅓ or less than the entire time and average outputs of the respective light sources becomes ⅓ or less than the maximum outputs of the respective light sources. On the contrary, in this embodiment, the respective laser light sources 1a to 1c are turned on during most of the time except periods during which the beams move from the scan ending positions to the scan starting positions at high speeds as can be understood from FIG. 20. Therefore, average outputs substantially equal to the maximum outputs of the respective laser light sources 1a to 1c can be obtained for the respective laser light sources 1a to 1c.

The linear beams 13a to 13c are preferably scanned with equal and stable amplitude as shown in FIG. 20. To this end, in this embodiment, the photodetector 17 (see FIG. 18) for detecting the linear beams 13a to 13c is provided at a position near the spatial light modulation element 5 and outside the display range of the spatial light modulation element 5. By the control of the MEMS mirror 9 by the timing controller 16 in accordance with a detection signal of the photodetector 17, the scan ranges and the scan speeds of the respective light beams can be accurately controlled. As a result, color balance can be accurately controlled, light utilization efficiency is increased because of no excessive scanning to enable the display of bright images and it can be prevented that the scan angle and the scan speed vary due to an ambient temperature change.

The photodetector 17 may not be provided near the spatial light modulation element 5 and may be provided at any position between the MEMS mirror 9 and the projection lens 6. Further, a beam splitting member may be provided at any position between the MEMS mirror 9 and the projection lens 6 and the photodetector 17 may be provided at a different position between the MEMS mirror 9 and the projection lens 6.

Figure 21:
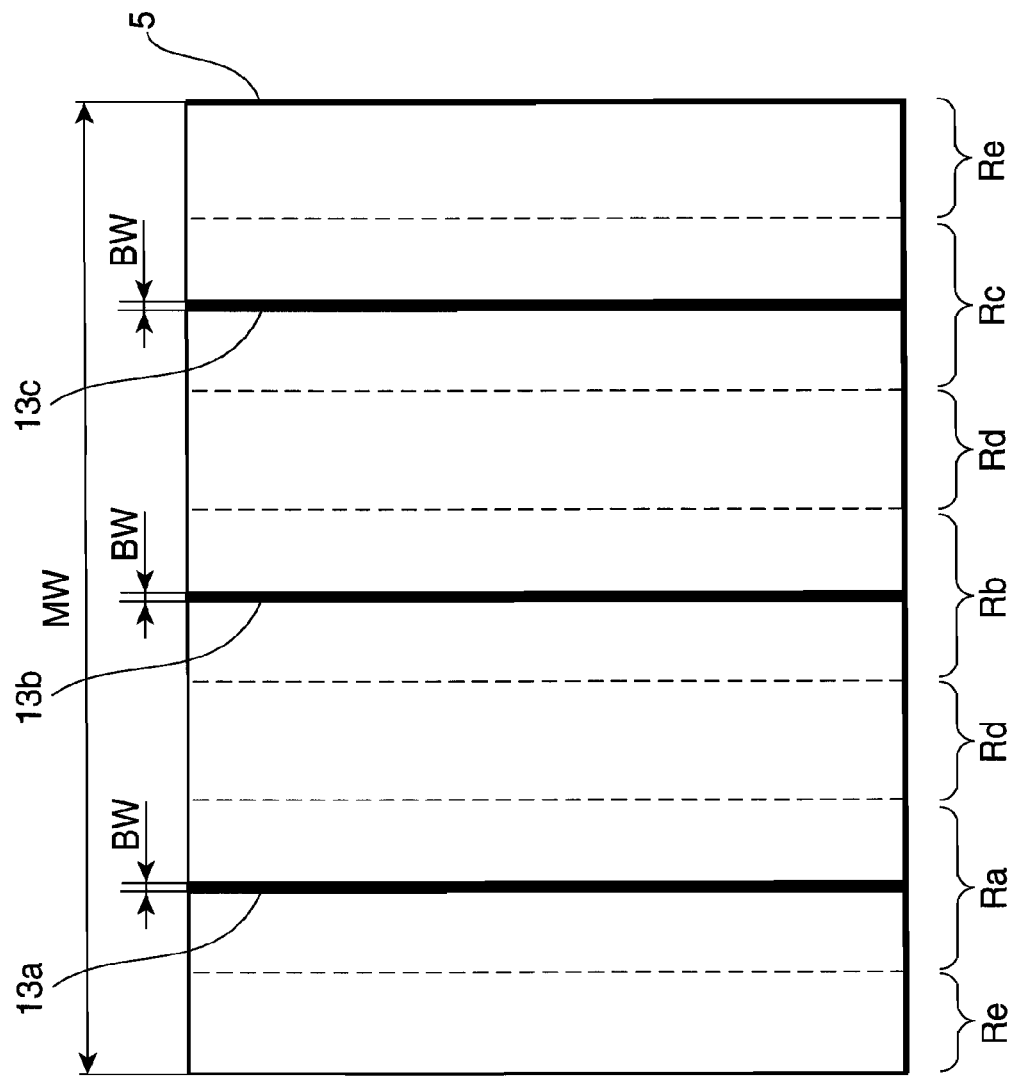
FIG. 21 is a diagram showing an example of the configuration of a display region on a spatial light modulation element shown in FIG. 18.

FIG. 21 is a diagram showing an example of the configuration of the display region on the spatial light modulation element 5 shown in FIG. 18. When the respective linear beams 13a to 13c are scanned on the spatial light modulation element 5 as described above, the region on the spatial light modulation element 5 is divided into a red image display region Ra used for the display of the red image 14a, a green image display region Rb used for the display of the green image 14b and a blue image display region Rc used for the display of the blue image 14c. The red linear beam 13a is located at the central position of the red image display region Ra, the green linear beam 13b is located at the central position of the green image display region Rb and the blue linear beam 13c is located at the central position of the blue image display region Rc.

Here, it is preferable to set black display regions Rd not used for the image display between the red image display region Ra, the green image display region Rb and the blue image display region Rc. Although the respective linear beams 13a to 13c have substantially linear shapes on the spatial light modulation element 5, minimal stray lights spread in a direction of the line width (width in a shorter-side direction) BW of the linear beams 13a to 13b due to diffuse reflection in the diffusion plate 3 or the like and some of them reach the other adjacent color image display regions beyond the image display regions Ra to Rc. Since different colors are mixed by these stray lights, pure color cannot be displayed.

Accordingly, in this embodiment, the black display regions Rd are provided between the red, green and blue image display regions Ra, Rb and Rc as shown in FIG. 21. The spatial light modulation element 5 cuts off the stray lights spreading in the line width direction in the black display regions Rd by turning off the switching elements located in the black display regions Rd, wherefore pure colors can be respectively displayed in the red, green and blue image display regions Ra, Rb and Rc and the saturations of the respective colors can be improved. Regions Re at the opposite ends in FIG. 21 may also be used as the black display regions.

Another feature of this embodiment is that the width BW (see FIG. 21) of the linear beams 13a to 13c is ¹/₁₀ or less of the scan range SW (see FIG. 20) in the scan direction of the linear beams 13a to 13c. If the linear beams 13a to 13c have a definite width, the linear beams 13a to 13c need to be scanned in a range larger than the spatial light modulation element 5 in order to make an illuminance distribution on the spatial light modulation element 5 uniform. If the scan range SW is narrower than the width (width in a longer-side direction) MW (see FIG. 21) of the spatial light modulation element 5, illuminance is dark at the opposite end portions of the spatial light modulation element 5 that serve as the scan starting position and the scan ending position. In order to prevent illuminance decreases at the end portions, the linear beams 13a to 13c may be scanned in a range wider than the width MW of the spatial light modulation element 5.

More specifically, the linear beams 13a to 13c may be scanned by a distance expressed by a sum (MW+BW) of the width MW of the spatial light modulation element 5 and the width BW of the linear beams 13a to 13c. At this time, light utilization efficiency decreases since the linear beams 13a to 13c irradiate an area wider than the spatial light modulation element 5. However, if the width BW of the linear beams 13a to 13c is ¹/₁₀ or less of the scan range SW in the scan direction of the linear beams 13a to 13c as in this embodiment, a decrease in the light utilization efficiency caused by the irradiation of such an area outside the spatial light modulation element 5 is 10% or less, wherefore a decrease in brightness caused by the efficiency decrease can be prevented.

The line width BW of the linear beams 13a to 13c preferably satisfies a relationship BW<SW/(2n) if SW, n denote the scan width of the linear beams 13a to 13c and the number of the laser light sources (e.g. 3 in this embodiment). In this case, the spacing between the adjacent linear beams 13a to 13c is SW/n and the line width BW of the linear beams 13a to 13c is smaller than half the spacing. By using the linear beams 13a to 13c having the narrow line width BW in this way, it becomes possible to suppress a percentage that stray lights caused by the diffuse reflection in the diffusion plate 3 and the like enter the image display regions of the adjacent colors. Therefore, pure colors can be respectively displayed in the red, green and blue image display regions Ra, Rb and Rc and the color saturations of the respective colors can be improved.

The scan direction of the linear beams 13a to 13c on the spatial light modulation element 5 is preferably parallel to the longer sides (sides having a length MW) of the display range of the spatial light modulation element 5 as shown in FIG. 21. Since the respective linear beams 13a to 13c can be widely spaced apart on the spatial light modulation element 5 in this case, it becomes possible to suppress a percentage that stray lights caused by the diffuse reflection in the diffusion plate 3 and the like enter the image display regions of the adjacent colors, pure colors can be respectively displayed in the red, green and blue image display regions Ra, Rb and Rc and the color saturations of the respective colors can be improved.

Still another feature of this embodiment is that the laser light sources 1a to 1c are used as light sources. In recent years, the miniaturization and streamlining of ultrahigh pressure mercury lamps and metal halide lamps have been significant. The sizes of light emission points of these light sources are determined by an arc discharge length and are about 1 mm. Thus, in a 2-dimensional image display device using lamp light sources, light beams of three colors cannot be irradiated on one spatial light modulation element in an efficiently divided manner, which has caused a problem of lower light utilization efficiency. On the contrary, since laser light sources having high directivities are used as the laser light sources 1a to 1c in this embodiment, lights from the respective laser light sources 1a to 1c can be converted into narrow linear beams 13a to 13c to irradiate the same spatial light modulation element 5.

Figure 22:
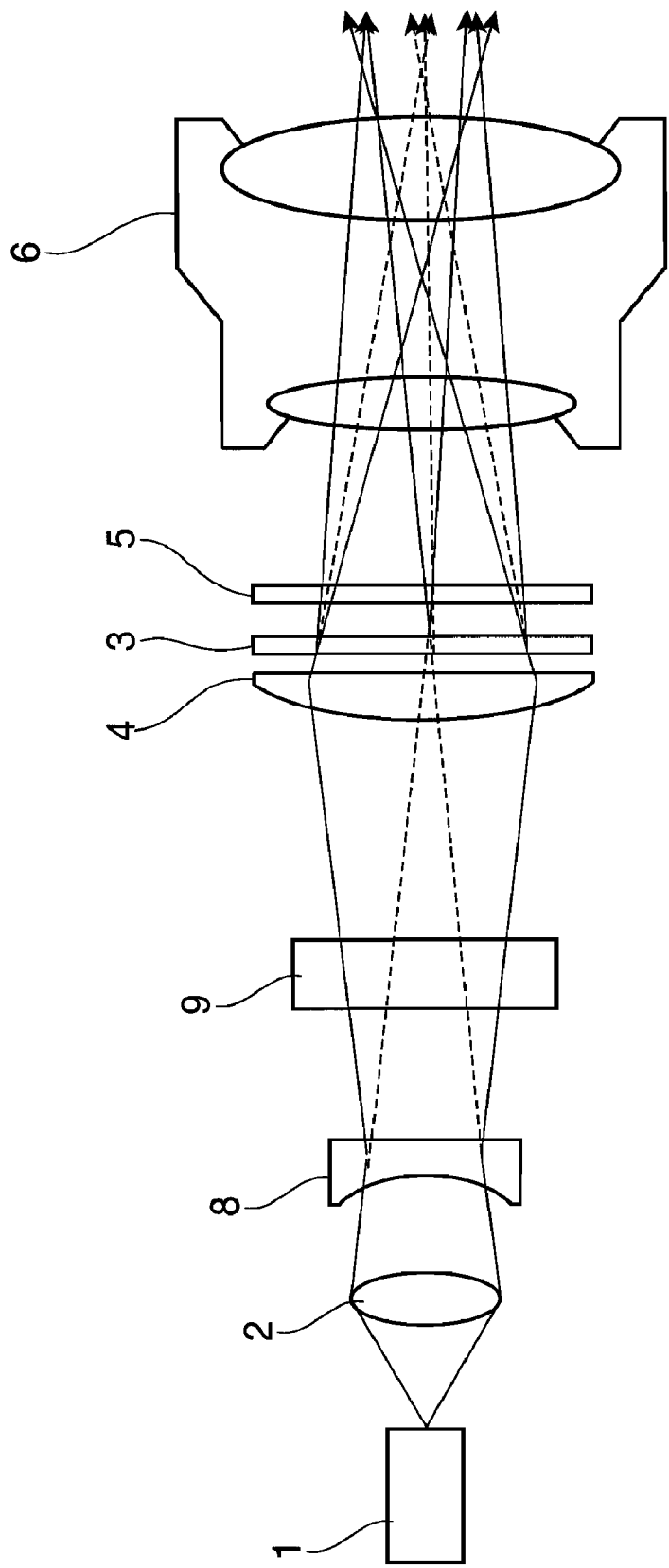
FIG. 22 is a schematic diagram showing the construction of an optical system of the 2-dimensional image display device shown in FIG. 18 in horizontal direction.
Figure 23:
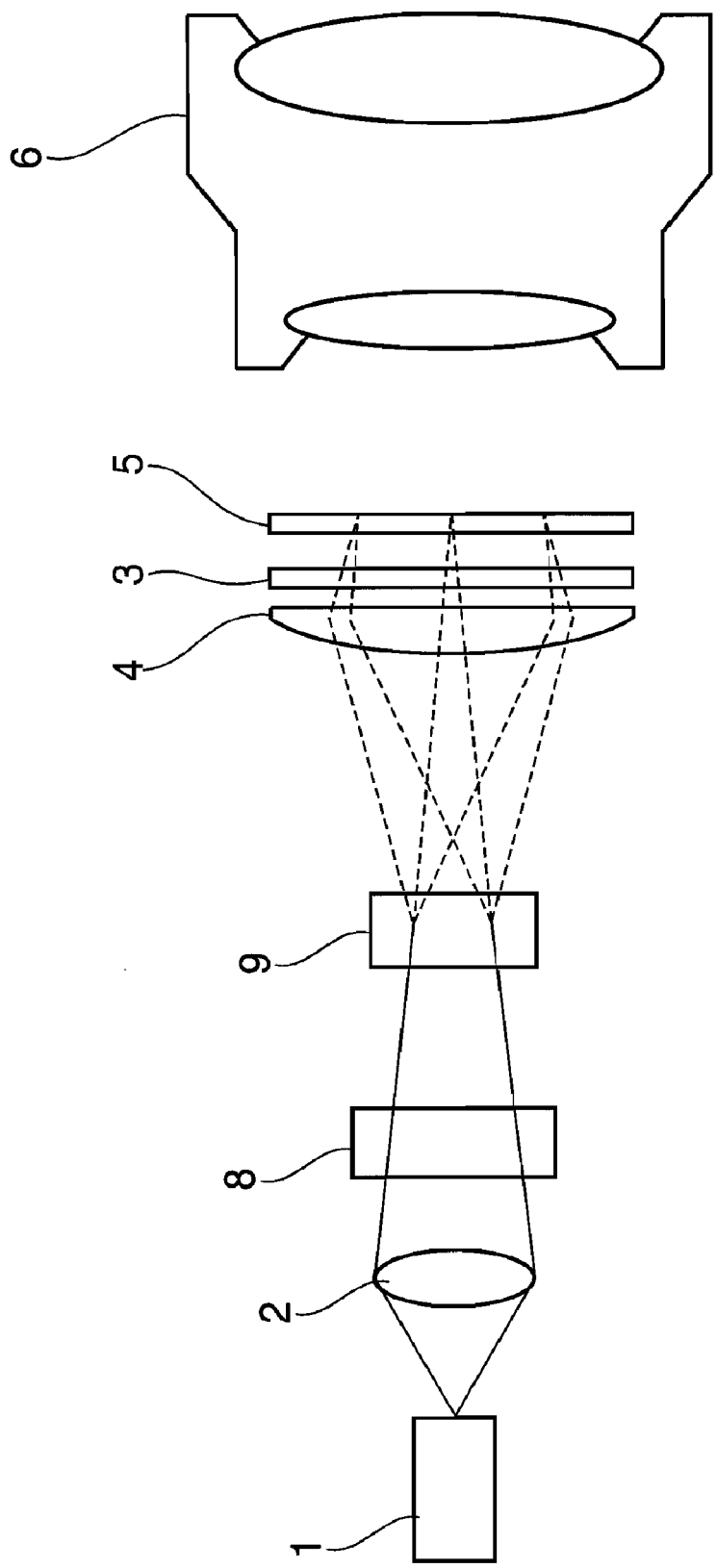
FIG. 23 is a schematic diagram showing the construction of the optical system of the 2-dimensional image display device shown in FIG. 18 in vertical direction.

The schematic constructions of the optical system of the 2-dimensional image display device shown in FIG. 18 in horizontal direction and in vertical direction are shown in FIGS. 22 and 23. As shown in FIGS. 22 and 23, a condenser lens 2 is used to condense a divergent light from the laser light source 1. The light converted into a substantially convergent beam by the condenser lens 2 is converted into a divergent beam by a concave lens 8 in horizontal direction as shown in FIG. 22. The concave lens 8 is made of a cylindrical lens and has no lens power in vertical direction and the convergent beam passes through the concave lens 8 as it is as shown in FIG. 23. The light beam converted into the divergent beam by the concave lens 8 is converted into a parallel beam or a slightly convergent beam by the field lens 4 to propagate toward the aperture of the projection lens 6 after being reflected by the MEMS mirror 9. Thus, there is no vignetting in the projection lens 6 and light utilization efficiency improves. The above condenser lens 2 and field lens 4 are not shown in FIG. 18 for simplicity.

Another feature of this embodiment is to effectively suppress the speckle noise by scanning the linear beams 13a to 13c. The diffusion plate 3 is disposed before and proximate to the spatial light modulation element 5. The diffusion plate 3 is, for example, a ground glass substrate having a convexo-concave pattern formed on the top surface of a transparent glass substrate or resin substrate, gives a random phase distribution to the wavefront of an incident light and converts an incident beam into a divergent beam.

Here, the linear beams 13a to 13c move on the diffusion plate 3 as the light beam is scanned by the MEMS mirror 9. At this time, the incidence angle of the light incident on the spatial light modulation element 5 changes and, consequently, the incidence angle of the light incident on the screen 7 changes to change the pattern of the speckle noise. By scanning the linear beams 13a to 13c at high speeds, the pattern of the speckle noise sensed by an observer changes at a high speed and is time-averaged, whereby a high quality image free from speckle noise is observed.

An f-number corresponding to the diffusion angle of the diffusion plate 3 is preferably equal to or larger than an f-number at the incidence side of the projection lens 6. Specifically, in a normal projector, the f-number at the incidence side of the projection lens 6 is about 1.4 to 2.5. At this time, the diffusion angle of the diffusion plate 3 is preferably 42° to 23° respectively with the full-angle-half-power. If the diffusion angle exceeds this range, lights diffused at large angles out of those diffused by the diffusion plate 3 cannot pass through the aperture of the projection lens 6 to reduce light utilization efficiency.

Although the cylindrical lens 8 in the form of the concave lens is used as a 1-dimensional beam expanding member for expanding the emission lights from the laser light sources 1a to 1c in a 1-dimensional direction in the above description, a beam splitting member using a grating may also be used as in the above second embodiment. At this time, the linear beams on the spatial light modulation element 5 become a 1-dimensional spot array. A holographic element designed to have a suitable phase distribution determined by the cross-sectional shape (generally called a CGH (computer generated hologram)) is similarly usable as the 1-dimensional beam expanding member for converting an incident beam into a 1-dimensional spot array. Further, a lenticular lens may be similarly used. Although the concave lens 8 as a light transmitting element shown in FIGS. 18 and 22 is used in this embodiment, light reflecting elements such as concave mirrors may be used as the above cylindrical lens, the grating member and the 1-dimensional beam expanding member such as a CGH.

Still another feature of this embodiment is to use the spatial light modulation element 5 whose elements have switching speeds of 5.5 milliseconds or faster. A frame repetition frequency of a normal video motion signal is 30 frames per second, and videos to be displayed by the respective elements of the spatial light modulation element 5 switch at least 90 times per second when full color moving images are displayed using the laser light sources 1a to 1c of three colors. In other words, videos are switched at every interval of 11 milliseconds. If the switching speed of the spatial light modulation element 5 is slow, crosstalks between the video signals of the respective colors appear, causing color shifts and color fading. On the other hand, in this embodiment, the switching can be completed when laser beams of the respective colors are irradiated and desired color moving images free from color shifts and color fading can be displayed by using the spatial light modulation element 5 having a switching time of 5.5 milliseconds or shorter, which is half the above switching time.

The switching speed of the respective elements of the spatial light modulation element 5 is more preferably 1.8 milliseconds or faster. Out of 30 color images displayed every second, images of the respective colors are preferably simultaneously displayed. However, the display timings of the images of the respective colors are slightly shifted in this embodiment where the images of the respective colors are displayed while the beams of the respective colors scan different positions on the spatial light modulation element 5. Thus, a phenomenon in which color shifts are seen at moving contours is likely to occur upon displaying moving images representing intense motions. On the other hand, the color shifts of the contours can be prevented by repeatedly displaying the same image a plurality of times. Actually, when the same image was repeatedly displayed three or more times, i.e. when 90 frames were displayed per second for the images of the three colors, there were no more color shifts of the contours. By using the spatial light modulation element 5 whose elements have a switching speed of 1.8 milliseconds or faster, this display method can be realized and moving images having no color shifts of contours can be displayed.

Further, in the case of displaying interlaced color moving images, the switching speed of the respective elements of the spatial light modulation element 5 is preferably 2.7 milliseconds or faster. At the time of the interlaced display of video motion signals of 30 frames per second, 60 images are switched per second. At the time of displaying full color moving images using the laser light sources 1a to 1c of three colors, videos to be displayed by the respective elements of the spatial light modulation element 5 are switched at least 180 times per second. In other words, videos are switched at every interval of 5.5 milliseconds. If the switching speed of the spatial light modulation element 5 is slow, crosstalks between the video signals of the respective colors appear, causing color shifts and color fading. On the other hand, the switching can be completed when laser beams of the respective colors are irradiated and desired interlaced color moving images free from color shifts and color fading can be displayed by using the spatial light modulation element 5 having a switching time of 2.7 milliseconds or shorter, which is half the above switching time.

The switching speed of the respective elements of the spatial light modulation element 5 is more preferably 0.9 milliseconds or faster. In the case of using the spatial light modulation element 5 whose elements have a switching speed of 0.9 milliseconds or faster, the same image can be repeatedly displayed three or more times, wherefore interlaced moving images free from color shifts in contours can be displayed.

A liquid crystal element using a ferroelectric liquid crystal is preferably used as the spatial light modulation element having a high switching speed as described above. Although the transmission-type spatial light modulation element 5 is used in this embodiment, a so-called LCOS device constructed such that a reflection film is formed on a silicon substrate and a liquid crystal element is further mounted, a so-called DLP device constructed such that the direction of a reflected light is controlled to form a light switch array by vibrating a micromirror made of a MEMS mirror or the like, or a light switch array having another arbitrary construction can be similarly used.

Figure 24:
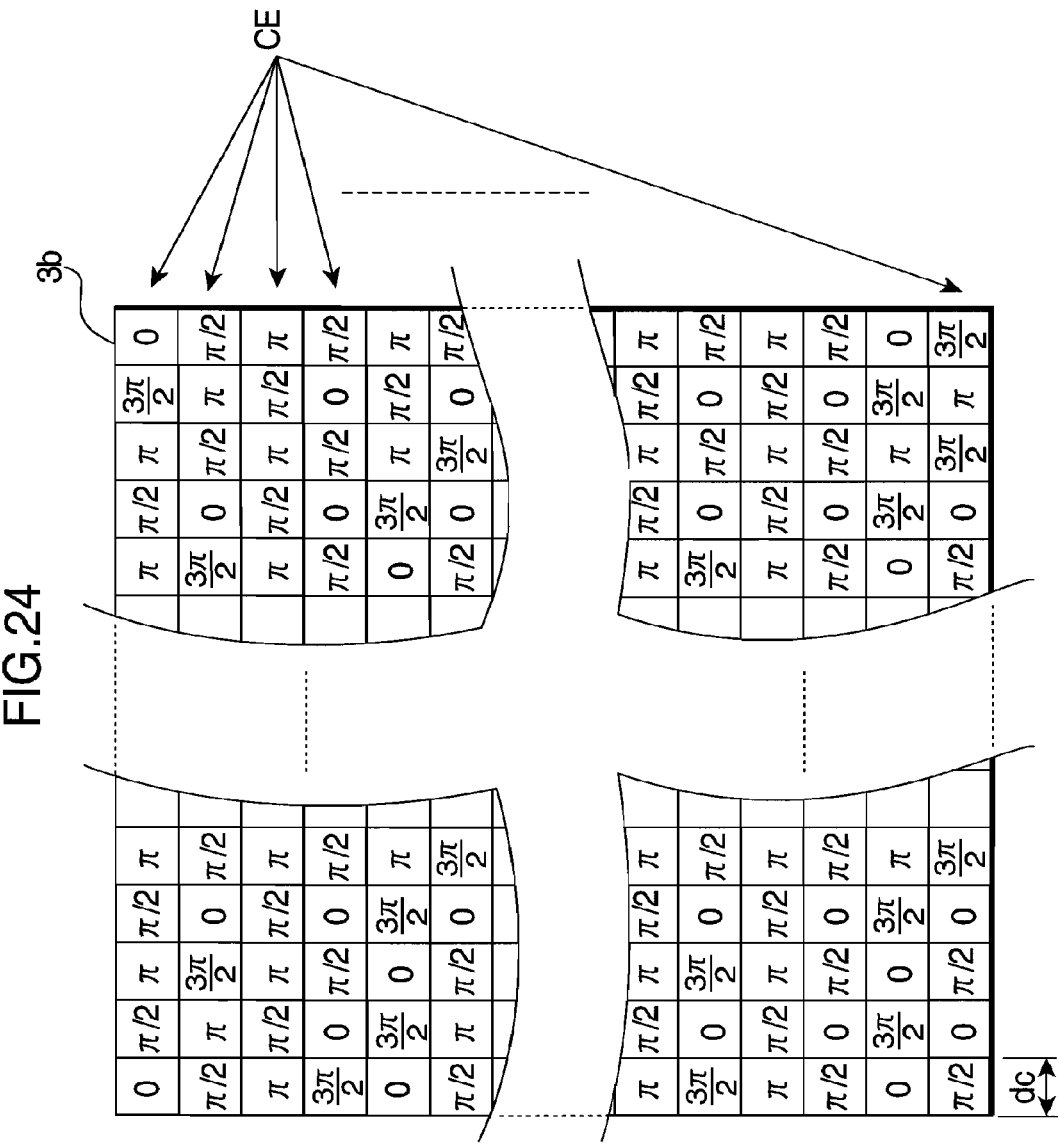
FIG. 24 is a diagram showing an example of a pseudo random diffusion plate used in the 2-dimensional image display device shown in FIG. 18.

The diffusion plate used in this embodiment is not particularly limited to the above example, and a pseudo random diffusion plate described below may also be used. FIG. 24 is a diagram showing an example of a pseudo random diffusion plate used in the 2-dimensional image display device shown in FIG. 18.

The diffusion plate 3 shown in FIG. 18 is fabricated by randomly roughening the top surface of a transparent substrate normally made of glass, resin or the like, whereas the pseudo random diffusion plate 3b shown in FIG. 24 is fabricated by forming a latticed convexo-concave pattern on the top surface of a transparent substrate. The top surface of the pseudo random diffusion plate 3b is divided into 2-dimensional latticed cells CE, and the depths of the convexo-concave pattern are randomly set so that the phases of lights passing through the respective cells CE randomly change. The maximum depth may be set to (/(n−1).

The advantage of using the pseudo random diffusion plate 3b shown in FIG. 24 is that a diffusion angle of the light passing through the pseudo random diffusion plate 3 can be strictly controlled by the size of the cells. Specifically, the light is diffused to have an intensity distribution I(( )= (sin(( )/((2((=((de/(((( )) if dc and (denote the cell interval of the latticed cells and an angle. For example, in order to fabricate a diffusion plate whose full-angle-half-power is 10(, I (( )=½ is substituted into the above equation to obtain the cell interval dc corresponding to a wavelength (. In the case of using blue, green and red light sources having wavelengths (=0.473, 0.532 and 0.640 micrometers respectively, fabrication may be made to have cell intervals dc of 2.4, 2.7 and 3.2 micrometers respectively.

On the other hand, since the surface shapes of normal diffusion plates are random, there are problems that (1) light utilization efficiency decreases because diffusion angles locally differ depending on spots, (2) intensity distribution nonuniformity appears in an image because transmittance changes depending on spots and (3) it is difficult to stably fabricate in such a manner as to have a constant diffusion angle. The normal diffusion plates have another problem of disrupting a deflection direction when a large diffusion angle is taken. The pseudo random diffusion plate 3b shown in FIG. 24 can solve these problems.

The pseudo random diffusion plate 3b of FIG. 24 can be fabricated by forming a convexo-concave pattern on a glass plate by a photolithography method and an etching method used in a normal semiconductor process. At this time, if a phase transition is selected to be, for example, 0, π/2, π, 3π/2 as in FIG. 24, the pseudo random diffusion plate 3b can be easily fabricated by two etching processes corresponding to the phase transitions to π/2 and to π.

Ninth Embodiment

Figure 25:
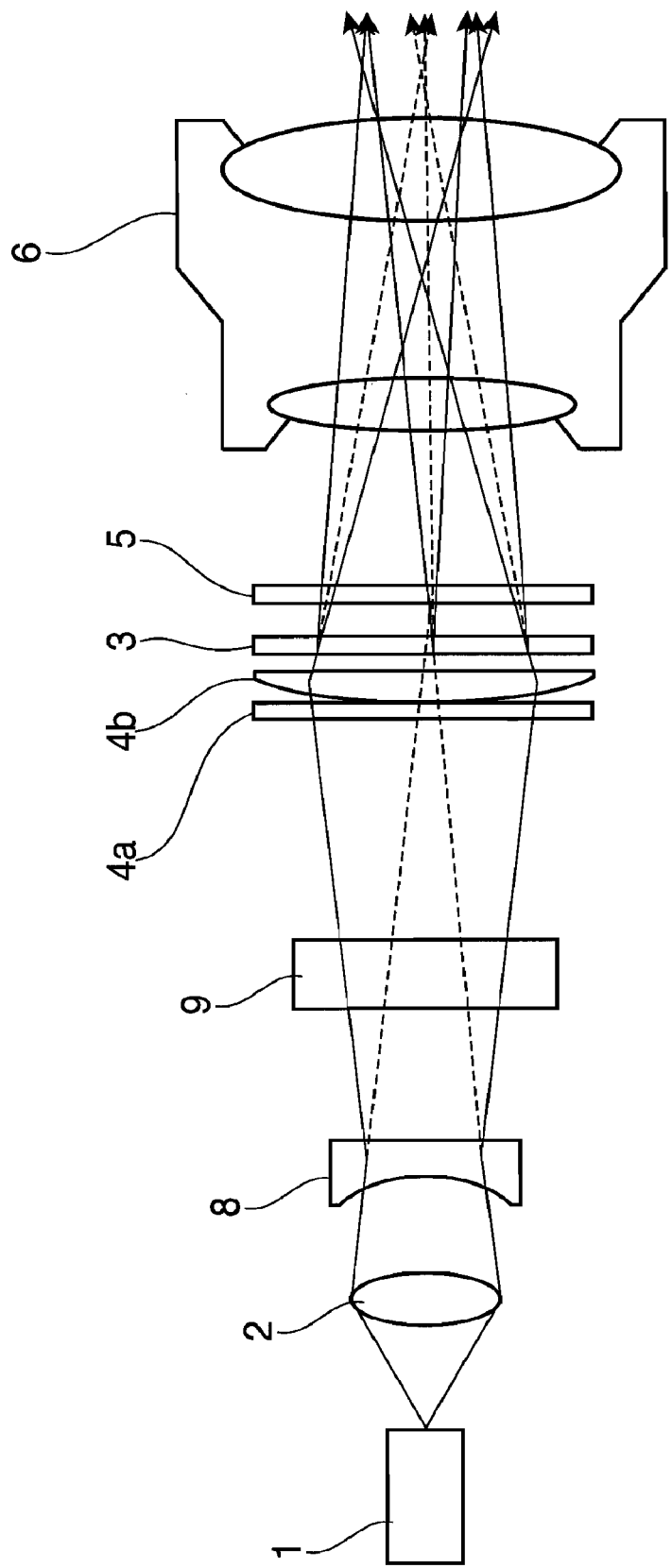
FIG. 25 is a schematic diagram showing the construction of an optical system of a 2-dimensional image display device according to a ninth embodiment of the invention in horizontal direction.
Figure 26:
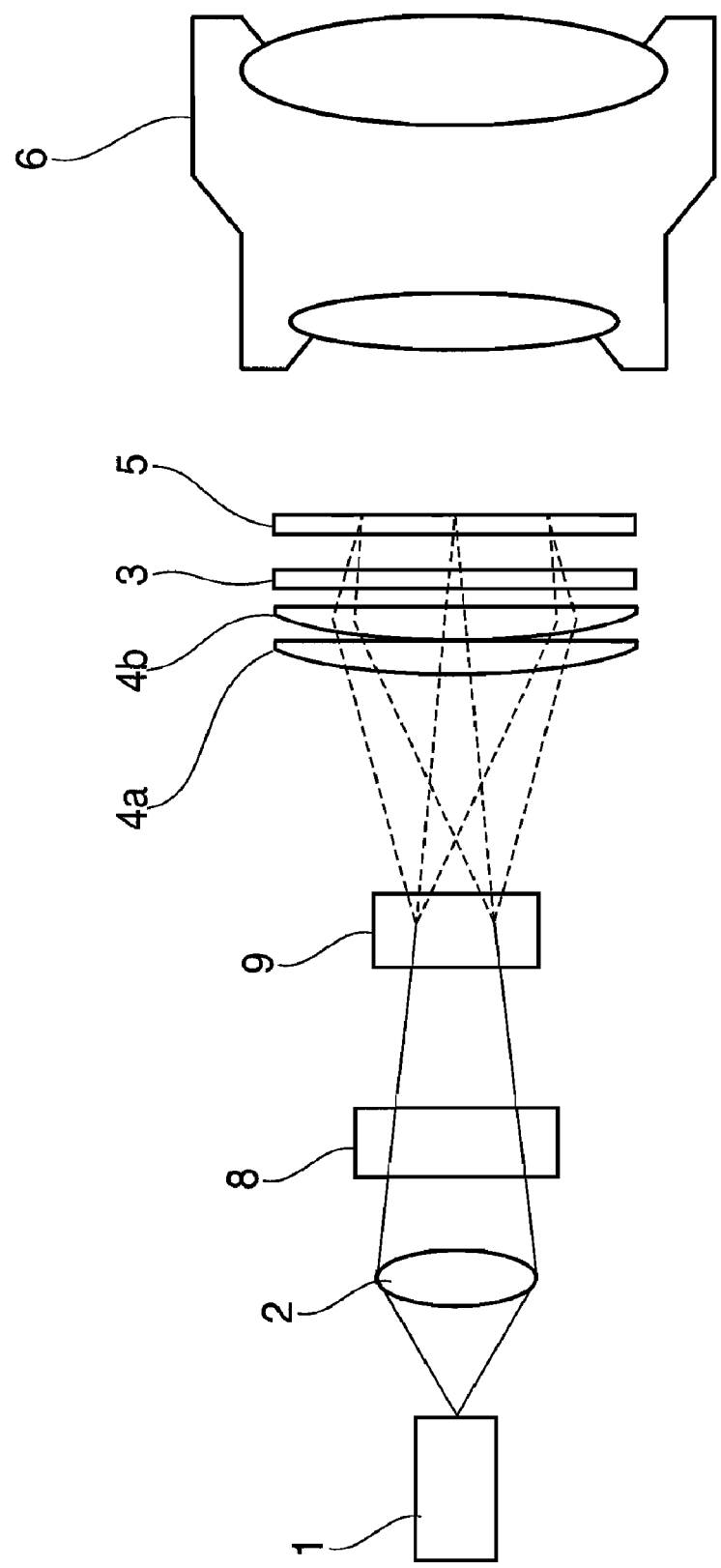
FIG. 26 is a schematic diagram showing the construction of the optical system of the 2-dimensional image display device according to the ninth embodiment of the invention in vertical direction.

Next, a ninth embodiment of the present invention is described. FIGS. 25 and 26 are diagrams showing the schematic constructions of an optical system of a 2-dimensional image display device according to the ninth embodiment of the present invention in horizontal direction and in vertical direction. Since the 2-dimensional image display device according to the ninth embodiment is the same as the one according to the eighth embodiment except that first and second field lens 4a, 4b shown in FIGS. 25 and 26 are used instead of the field lens 4 shown in FIGS. 22 and 23, the same parts are neither shown nor described in detail.

As shown in FIGS. 25 and 26, in this embodiment, a laser light source 1, a condenser lens 2, a concave lens 8, a MEMS mirror 9, the first field lens 4a, the second field lens 4b, a diffusion plate 3, a spatial light modulation element 5 and a projection lens 6 are arranged in this order, and the concave lens 8 converts a light, which was converted into a substantially convergent beam by the condenser lens 2, into a divergent beam in horizontal direction as shown in FIG. 25.

Here, the first field lens 4a is made of a cylindrical lens having a convex part in vertical direction, and the second field lens 4b is made of a convex lens. Accordingly, as shown in FIG. 25, the first field lens 4a has no lens power in horizontal direction (expanding direction), and the light beam expanded by the concave lens 8 passes through the first field lens 4a as it is, is suitably condensed by the second field lens 4b to be introduced to the diffusion plate 3 and the spatial light modulation element 5. On the other hand, as shown in FIG. 26, the first field lens 4a has a lens power in vertical direction (direction normal to the expanding direction), and the light beam having passed through the concave lens 8 as it is sufficiently condensed by the first and second field lenses 4a, 4b to be introduced to the diffusion plate 3 and the spatial light modulation element 5. The lens power of the field lens portion made up of the first and second field lenses 4a, 4b in the expanding direction is set smaller than the lens power in a direction normal to the expanding direction. The number of lenses constituting the field lens portion is not particularly limited to the above example, and one, three or more lenses may be used.

Accordingly, in this embodiment, effects similar to those of the eighth embodiment can be obtained, and the light beam expanded at a small expansion angle can be suitably condensed and suitably irradiated onto the spatial light modulation element 5 using the first and second field lenses 4a, 4b having a small lens power in the expanding direction in the case where the laser light source 1, the concave lens 8, the MEMS mirror 9, the first and second field lenses 4a, 4b, the diffusion plate 3 and the spatial light modulation element 5 are arranged in this order and the expansion angle of the light beam by the concave lens 8 is small.

Tenth Embodiment

Figure 27:
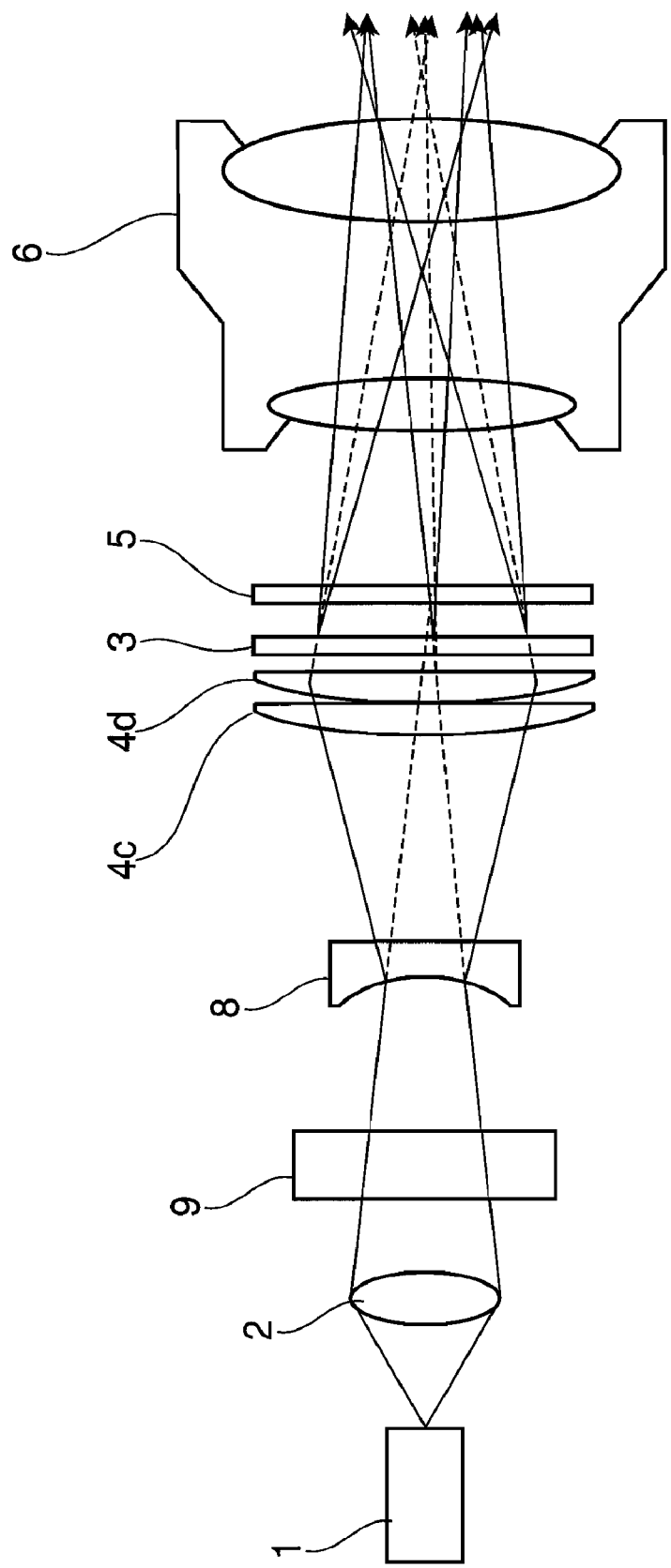
FIG. 27 is a schematic diagram showing the construction of an optical system of a 2-dimensional image display device according to a tenth embodiment of the invention in horizontal direction.
Figure 28:
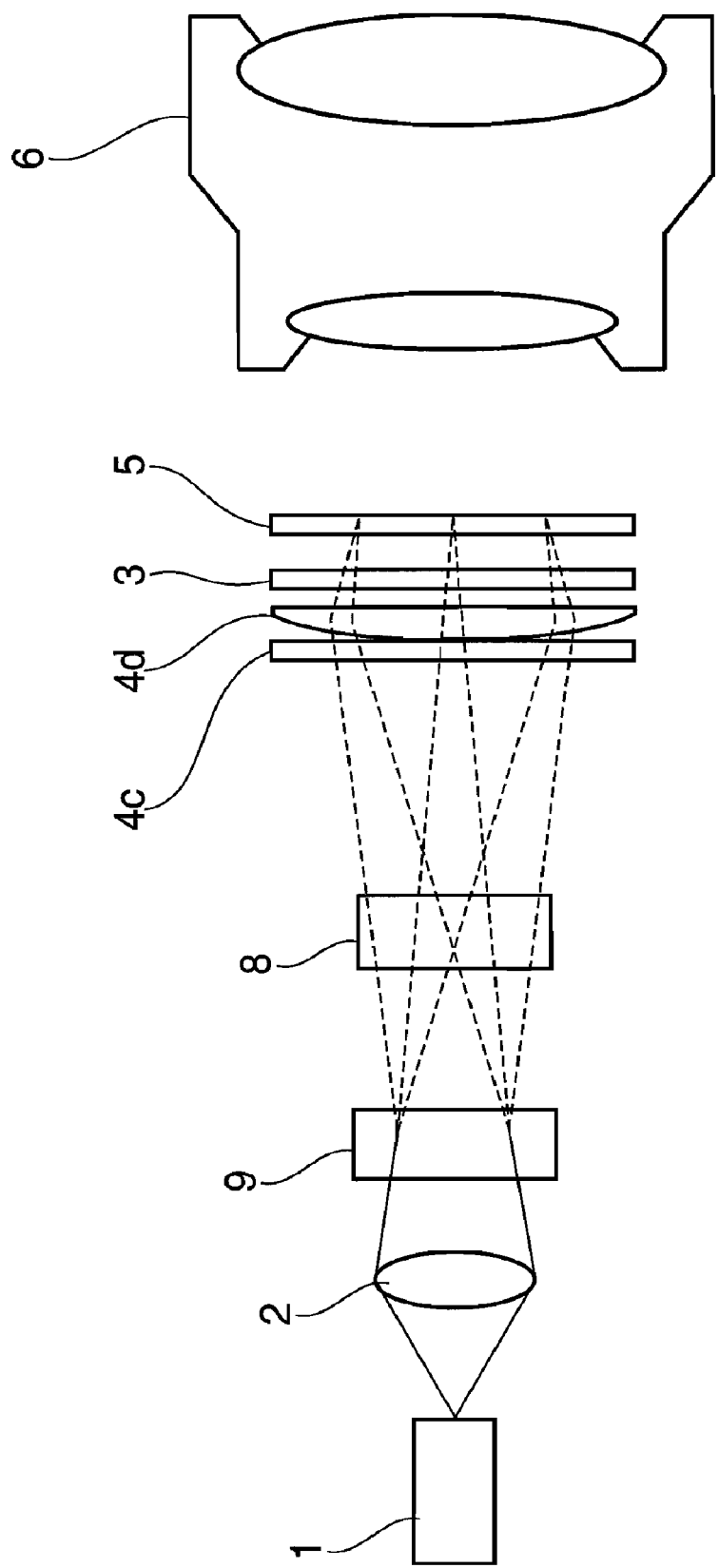
FIG. 28 is a schematic diagram showing the construction of the optical system of the 2-dimensional image display device according to the tenth embodiment of the invention in vertical direction.

Next, a tenth embodiment of the present invention is described. FIGS. 27 and 28 are diagrams showing the schematic constructions of an optical system of a 2-dimensional image display device according to the tenth embodiment of the present invention in horizontal direction and in vertical direction. Since the 2-dimensional image display device according to the tenth embodiment is the same as the one according to the eighth embodiment except that first and second field lens 4c, 4d shown in FIGS. 27 and 28 are used instead of the field lens 4 shown in FIGS. 22 and 23 and a concave lens 8 is arranged between a MEMS mirror 9 and the first field lens 4c, the same parts are neither shown nor described in detail.

As shown in FIGS. 27 and 28, in this embodiment, a laser light source 1, a condenser lens 2, the MEMS mirror 9, a concave lens 8, the first field lens 4c, the second field lens 4d, a diffusion plate 3, a spatial light modulation element 5 and a projection lens 6 are arranged in this order, and the concave lens 8 converts a light, which was converted into a substantially convergent beam by the condenser lens 2 and scanned by the MEMS mirror 9, into a divergent beam in horizontal direction as shown in FIG. 27.

Here, the first field lens 4c is made of a cylindrical lens having a convex part in horizontal direction, and the second field lens 4d is made of a convex lens. Accordingly, as shown in FIG. 27, the first field lens 4c has a lens power in horizontal direction (expanding direction), and the light beam scanned by the MEMS mirror 9 is sufficiently condensed by the first and second field lenses 4c, 4d to be introduced to the diffusion plate 3 and the spatial light modulation element 5 after being expanded by the convex lens 8. On the other hand, as shown in FIG. 28, the first field lens 4c has no lens power in vertical direction (direction normal to the expanding direction), and the light beam having passed through the concave lens 8 as it is passes through the first field lens 4c as it is and is suitably condensed by the second field lens 4d to be introduced to the diffusion plate 3 and the spatial light modulation element 56. In this way, the lens power of the field lens portion made up of the first and second field lenses 4c, 4d in the expanding direction is set larger than the lens power in the direction normal to the expanding direction. The number of lenses constituting the field lens portion is not particularly limited to the above example, and one, three or more lenses may be used.

Accordingly, in this embodiment, effects similar to those of the eighth embodiment can be obtained, and the light beam expanded at a large expansion angle can be suitably condensed and suitably irradiated onto the spatial light modulation element 5 using the first and second field lenses 4c, 4d having a large lens power in the expanding direction in the case where the laser light source 1, the MEMS mirror 9, the concave lens 8, the first and second field lenses 4c, 4d, the diffusion plate 3 and the spatial light modulation element 5 are arranged in this order and the expansion angle of the light beam by the concave lens 8 is large.

Although the projection display in which the projection optical system and the screen are separate is used as an example in the above description, the present invention is also applicable to rear-projection 2-dimensional image display devices in which a projection optical system and a transmission screen are combined and 2-dimensional image display devices of the type in which a spatial light modulation element illuminated by a laser from the rear side is directly observed (e.g. liquid crystal televisions presently in practical use).

As described above, the above respective 2-dimensional image display devices can display high-quality full color videos with less speckle noise by a simple construction and using a smaller number of parts while using the laser light sources, and can be utilized as projection system or rear-projection displays.

Although the color image display devices were described as examples, the present invention is also applicable to image projectors using a monochromatic laser, exposure illumination devices used, for example, in semiconductor processes or their light source devices. In an exposure illumination device, an ultraviolet laser is used as a laser light source, a photomask or the like formed, for example, by patterning a metal film on a glass substrate is used as a spatial light modulation element, and a mask pattern image is formed on a semiconductor substrate as a screen.

As described above, a 2-dimensional image display device according to one aspect of the present invention comprises at least one laser light source; a beam scan unit for converting an emission beam from the laser light source into a 2-dimensional light while scanning the emission beam at least in a 1-dimensional direction; a spatial light modulation element for spatially modulating the light scanned by the beam scan unit; and a light diffusion member disposed between the beam scan unit and the spatial light modulation element for diffusing the 2-dimensional light emerging from the beam scan unit.

Since the emission beam from the laser light source is converted into the 2-dimensional light while being scanned at least in the 1-dimensional direction in this 2-dimensional image display device, uniform illumination can be obtained. Further, since the light diffusion member is disposed between the beam scan unit and the spatial light modulation element and the 2-dimensional light emerging from the beam scan unit is diffused and irradiated onto the spatial light modulation element, the optical axis of the beam emerging from the light diffusion member to irradiate the spatial light modulation element can be changed moment by moment and speckle noise can be effectively suppressed. As a result, a beam expander, a light integrator and the like for uniform illumination become unnecessary, and uniform illumination can be obtained and the speckle noise can be effectively suppressed using a simple optical system.

It is preferable that the beam scan unit includes a 2-dimensional scanning portion for scanning the emission beam from the laser light source in a first direction and a second direction normal to the first direction; and that the 2-dimensional scanning portion cyclically scans the light beam incident on the light diffusion member at a frequency at which a ratio of a scan frequency in the first direction to a scan frequency in the second direction is a ratio of integers prime to each other.

In this case, the beam incident on the light diffusion member is cyclically scanned at the frequency at which the ratio of the scan frequency in the first direction to the scan frequency in the second direction is the ratio of integers prime to each other upon scanning the emission beam from the laser light source in the mutually orthogonal first and second directions. Thus, a difference between the scan speeds in the first and second directions can be made smaller, the construction of the 2-dimensional beam scanning portion can be simplified and the light diffusion member can be uniformly illuminated.

The beam scan unit preferably includes a 1-dimensional beam splitting portion for splitting the emission beam from the laser light source to generate a 1-dimensional multibeam array in which a plurality of beams are arrayed in a first direction and a 1-dimensional scanning portion for scanning the 1-dimensional multibeam array in the second direction normal to the first direction.

In this case, the miniaturization, lower power consumption and lower cost of the 1-dimensional beam splitting portion can be realized since the scan direction is 1-dimensional and the scan frequency is low.

The 1-dimensional beam splitting portion preferably has first and second splitting surfaces for splitting the emission beam from the laser light source at different intervals.

In this case, since light intensity distributions of the 1-dimensional multibeam arrays split at different intervals are combined, the nonuniformity of the light intensity distribution caused by a $0^{th}$-order diffracted light can be reduced.

The beam scan unit preferably includes a 2-dimensional beam splitting portion for splitting the emission beam from the laser light source in a first direction and a second direction normal to the first direction to generate a 2-dimensional multibeam in which a plurality of beams are 2-dimensionally arrayed, and a fine scanning portion for finely scanning the 2-dimensional multibeam.

In this case, the miniaturization, lower cost, lower power consumption and lower noise of the fine scanning portion can be realized since the scan angle of the 2-dimensional multibeam can be made smaller.

The 2-dimensional beam splitting portion preferably includes a first 1-dimensional beam splitting portion for splitting the emission beam from the laser light source to generate a 1-dimensional multibeam array in which a plurality of beams are arrayed in a first direction, and a second 1-dimensional beam splitting portion for splitting the 1-dimensional multibeam array generated by the first 1-dimensional beam splitting portion in a second direction normal to the first direction to generate a 2-dimensional multibeam.

In this case, the nonuniformity of a light intensity distribution caused by a $0^{th}$-order diffracted light can be reduced since the matrix-like 2-dimensional multibeam arrayed in the mutually orthogonal first and second directions is generated.

The 2-dimensional beam splitting portion preferably includes a 2-dimensional diffraction grating having inclined grating surfaces.

In this case, the $0^{th}$-order diffracted light and diffracted lights other than the $0^{th}$-order diffracted light can be split, thereby causing the diffracted lights other than the $0^{th}$-order diffracted light to irradiate the light diffusion member and the spatial light modulation element while preventing the $0^{th}$-order diffracted light from irradiating the light diffusion member and the spatial light modulation element. Therefore, a light intensity distribution on the spatial light modulation element can be made more uniform.

The beam scan unit preferably includes a vibrating portion for vibrating a 2-dimensional beam splitting portion for splitting the emission beam from the laser light source in a first direction and a second direction normal to the first direction to generate a 2-dimensional multibeam in which a plurality of beams are 2-dimensionally arrayed.

In this case, the number of parts can be reduced and the device can be further miniaturized since the 2-dimensional beam splitting portion is constructed integral to the vibrating portion.

It is preferable to further comprise reflection mirrors for surrounding an optical path between the beam scan unit and the light diffusion member and introducing a light beam from the beam scan unit to the light diffusion member after reflecting it a plurality of times.

In this case, since the optical path between the beam scan unit and the light diffusion member is covered by the reflection mirrors, the loss of the light beam can be prevented in this part to improve the light intensity distribution on the spatial light modulation element.

The reflection mirrors preferably further surround an optical path between the light diffusion member and the spatial light modulation element.

In this case, since the optical path between the light diffusion member and the spatial light modulation element is further covered by the reflection mirror, the loss of the light beam can be prevented also in this part to improve the light intensity distribution on the spatial light modulation element.

The laser light source preferably includes three laser light sources for generating red, green and blue colors.

In this case, a vivid image having high color purity can be displayed using red, green and blue lights, and a dichroic mirror and the like for multiplexing become unnecessary, thereby being able to simplify the optical system.

The light diffusion member and the spatial light modulation element are preferably in a one-to-one correspondence with each of the three laser light sources.

In this case, since the light is diffused for each color of the three laser light sources and the spatial light modulation elements can be individually controlled, a more vivid image having higher color purity can be displayed using the light diffusion members and the spatial light modulation elements suited to the wavelengths of the respective colors.

Emission beams from the three laser light sources are preferably incident on the beam scan unit at mutually different angles.

In this case, a dichroic mirror and the like for multiplexing become unnecessary and a 2-dimensional image display device can be realized by a simple optical system.

The light diffusion member preferably includes a pseudo random diffusion plate.

In this case, since a convexo-concave pattern for diffusing a light can be regularly formed, the light can be more uniformly diffused to improve light utilization efficiency, the nonuniformity of the light intensity distribution can be suppressed, fabrication can be stably made such that a diffusion angle is constant, and a deflection direction can be accurately controlled even if a large scattering angle is taken.

The beam scan unit preferably includes a beam expanding portion for expanding the emission beam from the laser light source in a first direction to generate a linear beam and a 1-dimensional scanning portion for scanning the linear beam in a second direction normal to the first direction.

In this case, since the scan direction is 1-dimensional and the scan frequency is small, the miniaturization, lower power consumption and lower cost of the 1-dimensional beam scan unit can be realized.

It is preferable that a field lens portion is further provided between the 1-dimensional scanning portion and the light diffusion member; that the laser light source, the beam expanding portion, the 1-dimensional scanning portion, the field lens portion, the light diffusion member and the spatial light modulation element are arranged in this order; and that a lens power of the field lens portion in the first direction is smaller than the one in the second direction.

In this case, since a light beam expanded at a small expansion angle can be suitably condensed, the light beam can be suitably irradiated onto the spatial light modulation element.

It is preferable that the beam scan unit includes a 1-dimensional scanning portion for scanning the emission beam from the laser light source in a first direction and a beam expanding portion for expanding the light beam scanned by the 1-dimensional scanning portion in a second direction normal to the first direction to generate a linear beam; that a field lens portion is further provided between the beam expanding portion and the light diffusion member; that the laser light source, the 1-dimensional scanning portion, the beam expanding portion, the field lens portion, and the spatial light modulation element are arranged in this order; and that a lens power of the field lens portion in the first direction is smaller than the one in the second direction.

In this case, since the scan direction is 1-dimensional and the scan frequency is small, the miniaturization, lower power consumption and lower cost of the 1-dimensional beam scanning portion can be realized. In addition, since the light beam expanded at a large expansion angle can be sufficiently condensed, the light beam can be suitably irradiated onto the spatial light modulation element.

It is preferable that the laser light source includes a plurality of laser light sources; and that linear beams from the plurality of laser light sources illuminate different positions on the spatial light modulation element.

In this case, a plurality of colors can be combined using one spatial light modulation element, and a dichroic mirror and the like for multiplexing become unnecessary, thereby being able to simplify the optical system.

The spatial light modulation element preferably modulates the respective linear beams from the plurality of laser light sources such that different videos corresponding to the respective linear beams are displayed in image display regions irradiated with the respective linear beams.

In this case, images of a plurality of colors can be combined using one spatial light modulation element.

It is preferable to set black display regions not transmitting the linear beams between the adjacent image display regions on the spatial light modulation element.

In this case, since stray lights of the linear beams spreading in a line width direction can be cut off by the black display regions, pure colors can be displayed in the image display regions of the respective colors and the color saturations of the respective colors can be improved.

A width BW of the linear beams in a shorter-side direction on the spatial light modulation element preferably satisfies a relationship BW<SW/10 if SW denotes a scan width of the linear beams.

In this case, illuminance decreases at end portions of the spatial light modulation element that serve as a scan starting position and a scan ending position can be prevented while suppressing a decrease in light utilization efficiency caused by irradiating a region outside the spatial light modulation element.

A width BW of the linear beams in a shorter-side direction on the spatial light modulation element preferably satisfies a relationship BW<SW/(2n) if SW, n denote a scan width of the linear beams and the number of the plurality of laser light sources.

In this case, pure colors can be displayed in image display regions of the respective colors and the color saturations of the respective colors can be improved since a percentage that stray lights caused by diffuse reflection in the light diffusion member enter the adjacent image display regions can be suppressed.

It is preferable that the plurality of laser light sources include a first laser light source for emitting a red light, a second laser light source for emitting a green light and a third laser light source for emitting a blue light; and that the spatial light modulation element modulates linear beams such that a red image is displayed in a red image display region irradiated with linear beams from the first laser light source, a green image is displayed in a green image display region irradiated with linear beams from the second laser light source and a blue image is displayed in a blue image display region irradiated with linear beams from the third laser light source.

In this case, a full color video can be displayed using one spatial light modulation element.

The switching speed of the spatial light modulation element is preferably 5.5 milliseconds or faster.

In this case, desired color moving images free from color shifts and color fading can be displayed since the switching can be completed when the laser beams of the respective colors are irradiated.

The switching speed of the spatial light modulation element is preferably 2.7 milliseconds or faster.

In this case, desired interlaced color moving images free from color shifts and color fading can be displayed since, upon displaying interlaced color moving images, the switching can be completed when the laser beams of the respective colors are irradiated.

The switching speed of the spatial light modulation element is preferably 1.8 milliseconds or faster.

In this case, moving images whose contours are free from color shifts can be displayed since the same image can be repeatedly displayed three or more times.

The switching speed of the spatial light modulation element is preferably 0.9 milliseconds or faster.

In this case, interlaced moving images whose contours are free from color shifts can be displayed since the same image can be repeatedly displayed three or more times upon displaying interlaced color moving images.

The spatial light modulation element is preferably made of a ferroelectric liquid crystal.

In this case, moving images as described above can be satisfactorily displayed since the switching speed can be set high.

The spatial light modulation element preferably includes a plurality of 2-dimensionally arrayed MEMS mirrors.

In this case as well, moving images as described above can be satisfactorily displayed since the switching speed can be set high.

Scan directions of lights from the plurality of laser light sources on the spatial light modulation element are preferably parallel to the longer sides of a display region of the spatial light modulation element.

In this case, since the lights from the respective laser light sources can be widely spaced apart on the spatial light modulation element, a percentage that stray lights caused by diffuse reflection in the light diffusion member enter the adjacent image display regions can be suppressed, pure colors can be displayed in the image display regions of the respective colors and the color saturations of the respective colors can be improved.

The light diffusion member preferably includes a pseudo random diffusion plate in which rectangular cells are 2-dimensionally arrayed, the cells shift the phases of lights passing therethrough and a difference in phase displacements between the adjacent cells is $\pi/2$.

In this case, the light can be more uniformly diffused to improve light utilization efficiency and the nonuniformity of the light intensity distribution can be suppressed since a convexo-concave pattern for diffusing the light can be regularly formed. Further, fabrication can be stably made to make a diffusion angle constant and, even if a large diffusion angle is taken, a deflection direction can be accurately controlled. Furthermore, easy fabrication is possible by reducing the number of etching processes.

A light beam diameter S on the light diffusion member preferably satisfies a relationship $S > L \cdot \theta - d$ if $\theta$, L and d denote the diffusion angle of the light diffusion member, a distance between the light diffusion member and the spatial light modulation element and the spacing between the adjacent light beams on the spatial light modulation element.

In this case, speckle noise can be further reduced since any arbitrary point on the spatial light modulation element can be illuminated by a diffused light from the plurality of light beams.

The emission beam from the laser light source is preferably substantially condensed on the spatial light modulation element.

In this case, light utilization efficiency can be improved since the light beam can be efficiently irradiated onto the spatial light modulation element.

It is preferable to further comprise a projection optical system for projecting the light modulated by the spatial light modulation element on a plane in a space.

In this case, a satisfactory video having the speckle noise effectively suppressed can be displayed on the plane in the space such as a screen.

The beam scan unit preferably includes a polarization inversion element.

In this case, a 2-dimensional image display device that is highly reliable, silent and speedy can be provided since the beam scan unit has no movable part.

An illumination light source according to another aspect of the present invention comprises at least one laser light source, a beam scan unit for scanning an emission beam from the laser light source at least in a 1-dimensional direction and a light diffusion member for diffusing the emission beam scanned by the beam scan unit.

An exposure illumination device according to still another aspect of the present invention comprises the above illumination light source, wherein the laser light source includes an ultraviolet laser.

By the above respective constructions, uniform illumination can be obtained since the emission beam from the laser light source is scanned at least in the 1-dimensional direction. Further, since the emission beam scanned by the beam scan unit is diffused, the optical axis of the beam emerging from the light diffusion member can be changed moment by moment, wherefore the speckle noise can be effectively suppressed. As a result, a beam expander, a light integrator and the like for uniform illumination become unnecessary, and uniform illumination can be obtained and the speckle noise can be effectively suppressed using a simple optical system.

INDUSTRIAL APPLICABILITY

A 2-dimensional image display device and the like according to the present invention can obtain uniform illumination and can effectively suppress the speckle noise using a simple optical system and, therefore, are suitably applicable to video display devices such as video projectors, television receivers and liquid crystal panels.

What is claimed is:

1. A 2-dimensional image display device comprising:
   at least one laser light source;
   a beam scan unit configured to convert an emission beam from said laser light source into a 2-dimensional light while scanning the emission beam at least in a 1-dimensional direction;
   a spatial light modulation element configured to spatially modulate the light scanned by said beam scan unit; and
   a light diffusion member disposed between said beam scan unit and said spatial light modulation element for diffusing the 2-dimensional light emerging from said beam scan unit,
   wherein said laser light source includes first, second and third laser light sources for generating red, green and blue colors, respectively, and
   wherein emission beams from said first, second and third laser light sources are incident on said beam scan unit at mutually different angles.

2. A 2-dimensional image display device according to claim 1, wherein said light diffusion member is one of a plurality of diffusion members and said spatial light modulation element is one of a plurality of spatial light modulation elements, said plurality of diffusion members and said plurality of spatial light modulation elements being in a one-to-one correspondence with said laser light sources.

3. A 2-dimensional image display device comprising:
   at least one laser light source;
   a beam scan unit configured to convert an emission beam from said laser light source into a 2-dimensional light while scanning the emission beam at least in a 1-dimensional direction;
   a spatial light modulation element configured to spatially modulate the light scanned by said beam scan unit; and
   a light diffusion member disposed between said beam scan unit and said spatial light modulation element for diffusing the 2-dimensional light emerging from said beam scan unit,
   wherein a light beam diameter S on the light diffusion member satisfies a relationship $S > L \cdot \theta - d$ if $\theta$, L and d denote the diffusion angle of said light diffusion member, a distance between said light diffusion member and said spatial light modulation element and the spacing between adjacent light beams emerging from said beam scan unit on said spatial light modulation element, and
   wherein the adjacent light beams have been split by a dimensional beam splitting grating.

* * * * *